(12) United States Patent
Wang et al.

(10) Patent No.: US 12,526,778 B2
(45) Date of Patent: Jan. 13, 2026

(54) INFORMATION CONFIGURATION METHOD AND APPARATUS, AND SYSTEM

(71) Applicant: Huawei Technologies Co., Ltd., Shenzhen (CN)

(72) Inventors: Zhou Wang, Shenzhen (CN); Yun Liu, Shenzhen (CN); Haibo Xu, Beijing (CN); Mengchen Zhang, Beijing (CN)

(73) Assignee: HAUWEI TECHNOLOGIES CO., LTD., Shenzhen (CN)

( * ) Notice: Subject to any disclaimer, the term of this patent is extended or adjusted under 35 U.S.C. 154(b) by 372 days.

(21) Appl. No.: 18/159,321

(22) Filed: Jan. 25, 2023

(65) Prior Publication Data
US 2023/0164751 A1    May 25, 2023

Related U.S. Application Data

(63) Continuation of application No. PCT/CN2021/107426, filed on Jul. 20, 2021.

(30) Foreign Application Priority Data

Jul. 28, 2020 (CN) .......................... 202010739294.5
Oct. 30, 2020 (CN) .......................... 202011200059.7

(51) Int. Cl.
*H04W 72/0446* (2023.01)
*H04W 72/53* (2023.01)
*H04W 76/28* (2018.01)

(52) U.S. Cl.
CPC ....... *H04W 72/0446* (2013.01); *H04W 72/53* (2023.01); *H04W 76/28* (2018.02)

(58) Field of Classification Search
CPC . H04W 72/0446; H04W 72/53; H04W 76/28; H04W 52/0216; H04W 52/0229;
(Continued)

(56) References Cited

U.S. PATENT DOCUMENTS

2012/0100811 A1    4/2012 Lin et al.
2019/0174411 A1*   6/2019 Xu .................. H04W 52/02
(Continued)

FOREIGN PATENT DOCUMENTS

CN          102457867 A      5/2012

OTHER PUBLICATIONS

3GPP TSG-RAN WG2 Meeting #108; R2-1915555; Source: Fraunhofer HHI, Fraunhofer IIS; Title: Resource Allocation for Mode 2 NR V2X; Reno, USA, Nov. 18-22, 2019 (Year: 2019).*
(Continued)

*Primary Examiner* — Mohammed S Chowdhury
(74) *Attorney, Agent, or Firm* — Conley Rose, P.C.

(57) ABSTRACT

An information configuration method includes generating first configuration information, where the first configuration information indicates a conflict resolution policy used when a sleep window conflicts with a sensing window, where the sleep window is a time resource in which a sleep state is to be entered, and the sensing window is a time resource in which a sensing operation is to be performed; and transmitting the first configuration information to configure the conflict resolution policy to be used when the sleep window conflicts with the sensing window such that a device receiving the first configuration information be able to execute the corresponding conflict resolution policy used when the sleep window conflicts with the sensing window.

20 Claims, 16 Drawing Sheets

(58) Field of Classification Search
CPC .......... H04W 52/0235; H04W 52/028; H04W 72/02; H04W 72/25; H04W 74/0808; H04W 92/18; H04W 72/20; H04W 72/0453; Y02D 30/70
See application file for complete search history.

(56) References Cited

U.S. PATENT DOCUMENTS

| | | | | |
|---|---|---|---|---|
| 2022/0377709 A1* | 11/2022 | Zhao | ............... | H04W 72/0446 |
| 2022/0386408 A1* | 12/2022 | Li | ..................... | H04W 76/38 |
| 2023/0084999 A1* | 3/2023 | Selvanesan | .......... | H04W 72/02 |
| | | | | 370/329 |
| 2023/0171740 A1* | 6/2023 | Buthler | ............ | H04W 72/0446 |
| | | | | 370/329 |
| 2023/0284136 A1* | 9/2023 | Ganesan | .............. | H04W 76/28 |
| | | | | 370/311 |

OTHER PUBLICATIONS

3GPP TSG RAN WG1 Meeting#90; R1-1712519; Source: Intel Corporation; Title: Design Options for eNB-Controlled and Relay UE-Assisted Resource Allocation; Prague, Czech Republic, Aug. 21-25, 2017 (Year: 2017).*
RP-193231 (revision of RP-193134), LG Electronics, "New WID on NR sidelink enhancement," 3GPP TSG RAN Meeting #86, Sitges, Spain, Dec. 9-12, 2019, 6 pages.

* cited by examiner

INFORMATION CONFIGURATION METHOD AND APPARATUS, AND SYSTEM

CROSS-REFERENCE TO RELATED APPLICATIONS

This is a continuation of International Patent Application No. PCT/CN2021/107426 filed on Jul. 20, 2021, which claims priority to Chinese Patent Application No. 202010739294.5 filed on Jul. 28, 2020 and Chinese Patent Application No. 202011200059.7 filed on Oct. 30, 2020. All of the aforementioned patent applications are hereby incorporated by reference in their entireties.

TECHNICAL FIELD

This disclosure relates to the field of communication technologies, and in particular, to an information configuration method and apparatus, and a system.

BACKGROUND

With development of communication technologies, an internet of things technology also develops rapidly. A sidelink (SL) is introduced in the internet of things technology to support direct communication between terminals. Based on sidelink communication, two terminals may directly transmit data to each other without transmitting the data to a network device for forwarding, to greatly reduce a data delay. In the sidelink communication, related information needs to be preconfigured for the terminal.

In some communication scenarios of the sidelink communication, the terminal may autonomously select a sidelink resource for data transmission over a sidelink. In this communication scenario, a sensing window needs to be preconfigured for the terminal, so that the terminal performs a sensing operation in the sensing window to determine an available sidelink resource required by data. A window area of the sensing window is a time resource. The sensing operation means collecting sensing information, determining a channel occupancy status based on the sensing information, and determining an available sidelink resource based on the channel occupancy status. The sensing information includes channel measurement information and the like.

Therefore, a discontinuous reception (DRX) technology is further introduced in the sidelink communication, so that the terminal can switch between an activated state and a sleep state, thereby reducing power consumption of the terminal. After the DRX technology is introduced, a DRX cycle needs to be additionally configured for the terminal, and the DRX cycle includes an activated window and a sleep window. The terminal is in the activated state in the activated window, and senses a physical downlink control channel (PDCCH) or a physical sidelink control channel (PSCCH). The terminal is in the sleep state in the sleep window, and does not sense or receive a downlink signal, to reduce power consumption. Window areas of the activated window and the sleep window each are a time resource. When the terminal is in the sleep state, because the terminal cannot detect physical sidelink shared channel (PSSCH)-reference signal received power (RSRP) and received signal strength indicator (RSSI) measurement, the terminal cannot perform the sensing operation.

Because the sensing window and the sleep window of the terminal are separately configured, the configured sensing window may conflict with the configured sleep window, that is, the window area of the sensing window overlaps the window area of the sleep window. In this case, the terminal does not know whether to perform the sensing operation or enter the sleep state.

SUMMARY

This disclosure provides an information configuration method and apparatus, to resolve a problem of a conflict between a sensing window and a sleep window in a related technology.

To resolve the foregoing technical problem, embodiments of this disclosure provide the following technical solutions.

According to a first aspect, an information configuration method is provided, applied to a communication device. The method includes the following. The communication device generates first configuration information, and transmits the first configuration information. The first configuration information is used to indicate a conflict resolution policy used when a sleep window conflicts with a sensing window. The sleep window is a time resource in which a DRX sleep state needs to be entered, and the sensing window is a time resource in which a sensing operation needs to be performed.

In this embodiment of this disclosure, the first configuration information is transmitted to configure the conflict resolution policy used when the sleep window conflicts with the sensing window, so that a terminal receiving the first configuration information can execute the corresponding conflict resolution policy used when the sleep window conflicts with the sensing window, thereby resolving a problem that the terminal does not know whether to perform the sensing operation or enter the sleep state when the sleep window conflicts with the sensing window, and ensuring smooth implementation of a data service while reducing power consumption overheads of the device.

It should be noted that the conflict resolution policy is a policy used to resolve the problem of the conflict between the sleep window and the sensing window, and may be operation-related information on an operation that needs to be performed when the sleep window conflicts with the sensing window. Time resources of the sleep window and the sensing window include a time domain resource and/or a frequency domain resource.

It should be further noted that, the sleep window and the sensing window may be configured by using configuration information, or may be specified by a standard, or may be negotiated by the communication device and the terminal. A manner of configuring the sleep window and the sensing window is not limited in this embodiment of this disclosure. For example, the communication device may configure a DRX cycle for the terminal by transmitting DRX configuration information. The DRX configuration information includes the DRX cycle, and the DRX cycle includes an activated window and a sleep window.

Optionally, the first configuration information may be transmitted in one or more of the following manners.

In a first implementation, the first configuration information is transmitted before the DRX configuration information or sensing window configuration information is transmitted.

In an example, before the DRX configuration information or the sensing window configuration information is transmitted, the first configuration information may be transmitted in a Radio Resource Control (RRC) manner, a media access control (MAC) control element (CE) manner, a sidelink control information (SCI) manner, or the like.

It should be noted that the DRX configuration information is used to indicate the sleep window, and the sensing window configuration information is used to indicate the sensing window. For example, the sensing window configuration information includes one or more of a sensing window cycle, time resource size information of the sensing window, and resource location information.

In other words, in the first implementation, the first configuration information may be separately configured before the sleep window or the sensing window is configured, so that a change to a configuration process of the sleep window or the sensing window can be avoided, to improve reliability.

In a second implementation, second configuration information is transmitted, where the second configuration information includes the first configuration information and one or more of the following information: the DRX configuration information or sensing window configuration information.

In an example, the first configuration information may be carried in the DRX configuration information for transmission, or the first configuration information may be carried in the sensing window configuration information for transmission, or the second configuration information that carries the first configuration information, the DRX configuration information, and the sensing window configuration information is transmitted.

In other words, in the second implementation, the first configuration information may be transmitted based on the DRX configuration information and/or the sensing window configuration information. In this way, signaling overheads can be reduced.

In a third implementation, before the DRX configuration information or sensing window configuration information is transmitted, the first sub-information is transmitted, and third configuration information is transmitted. The third configuration information includes second sub-information and one or more of the following information: the DRX configuration information or the sensing window configuration information.

The first sub-information is a part of the first configuration information, and the second sub-information is another part of the first configuration information.

In other words, in addition to the DRX configuration information or the sensing window configuration information, the part of the first configuration information is separately transmitted, and the other part of the first configuration information is transmitted based on the DRX configuration information or the sensing window configuration information. In this way, flexibility of information configuration can be improved.

Optionally, the first configuration information includes one or more of the following information:

A first type of information is sensing operation indication information, where the sensing operation indication information is used to indicate to perform a sensing operation in a target sleep window, and the target sleep window is all or a part of the sleep window that conflicts with the sensing window.

In other words, in the first type of information, the sensing operation indication information may indicate to perform the sensing operation instead of setting a device status to the sleep state in the target sleep window when the sleep window conflicts with the sensing window.

By using the first type of information, the target sleep window may be converted into the sensing window, and a function of the sleep window is no longer executed, to avoid a conflict between the sensing operation and the sleep state in the target sleep window.

A second type of information is indication information of a sub-window. The sub-window is a window associated with the target sleep window. The sensing operation needs to be performed in the sub-window associated with the target sleep window, and the sleep state needs to be entered in a window other than the sub-window in the target sleep window, or the sleep state needs to be entered in the sub-window associated with the target sleep window, and the sensing operation needs to be performed in a window other than the sub-window in the target sleep window.

It should be noted that the sub-window is a window associated with a part or all of the target sleep window. For example, the sub-window is the part or all of the target sleep window, or is a window that overlaps the part or all of the target sleep window.

In a possible implementation, the indication information of the sub-window is used to indicate the sub-window.

In another possible implementation, the indication information of the sub-window is used to indicate the sub-window, and is further used to indicate to enter the sleep state in the sub-window associated with the target sleep window, and perform the sensing operation in the window other than the sub-window in the target sleep window, or enter the sleep state in the sub-window associated with the target sleep window, and perform the sensing operation in the window other than the sub-window in the target sleep window.

In an example, the indication information of the sub-window may be resource location information of the sub-window, and is used to represent a time resource in which the sub-window is located. Alternatively, the indication information of the sub-window is location information of the sub-window in the target sleep window, and is used to represent the location of the sub-window in the target sleep window.

By using the second type of information, a device receiving the indication information of the sub-window is enabled to perform the sensing operation in a part of the target sleep window, and enter the sleep state in another part of the target sleep window, to avoid the conflict between the sensing operation and the sleep state in the target sleep window.

In a possible implementation, the first configuration information may further include first window indication information or second window indication information.

The first window indication information is used to indicate that the sub-window is a sensing sub-window, that is, used to indicate to perform the sensing operation in the sub-window associated with the target sleep window, and enter the sleep state in the window other than the sub-window in the target sleep window.

The second window indication information is used to indicate that the sub-window is a sleep sub-window, that is, used to indicate to enter the sleep state in the sub-window associated with the target sleep window, and perform the sensing operation in the window other than the sub-window in the target sleep window.

A third type of information is indication information of an available sidelink resource. The indication information of the available sidelink resource is used to indicate a sidelink resource that is required for data transmission and that is configured in the sleep state in the target sleep window.

It should be noted that the available sidelink resource may include a time domain resource and/or a frequency domain resource, and is used to transmit data.

According to the third type of information, an available sidelink resource may be reserved for the terminal by using the first configuration information. In this way, the terminal is in the sleep state in the target sleep window and does not perform the sensing operation, and data transmission can also be performed based on the reserved available sidelink resource, to ensure smooth implementation of a data service.

Optionally, the indication information of the sub-window includes one or more of the following information:

A first type of information is window size information of the sub-window. A start location of the sub-window is a start location of the target sleep window, or an end location of the sub-window is an end location of the target sleep window.

In the first type of information, the sub-window is a part of the target sleep window at the front or a part of the target sleep window at the rear.

It should be noted that the window size information of the sub-window is used to indicate a window size of the sub-window. The window size of the sub-window may include a size of the sub-window in time domain and/or a size of the sub-window in frequency domain.

It should be further noted that whether the start location of the target sleep window is used as the start location of the sub-window, or the end location of the target sleep window is used as the end location of the sub-window may be specified in a standard, or may be negotiated by the communication device and the terminal in advance, or may be configured by using configuration information. This is not limited in this embodiment of this disclosure.

In an example, in addition to the window size information of the sub-window, the indication information of the sub-window may further include first indication information or second indication information. The first indication information is used to indicate the start location of the sub-window, and the start location of the sub-window is the start location of the target sleep window. The second indication information is used to indicate the end location of the sub-window, and the end location of the sub-window is the end location of the target sleep window.

A second type of information is start location information and end location information of the sub-window.

In the second type of information, the sub-window is a part or all of the target sleep window, and may be a part of the target sleep window at the front or a part of the target sleep window at the rear, or may be a part of the target sleep window in the middle.

The start location information and the end location information of the sub-window are used to determine the time resource in which the sub-window is located. In an example, the start location information and the end location information of the sub-window may include time domain location information and/or frequency domain location information. In another example, the start location information and the end location information of the sub-window may also be start location information and end location information of the sub-window in the target sleep window.

A third type of information: In the third type of information, the sub-window is a plurality of windows that are spaced from each other in the target sleep window. The indication information of the sub-window includes start location information of the first window, and end location information of the last window in a plurality of windows, and a spacing rule for the plurality of windows.

It should be noted that the start location information of the first window and the end location information of the last window may include time domain location information and/or frequency domain location. Alternatively, the start location information of the first window may be start location information in the target sleep window, and the end location information of the last window may be end location information in the target sleep window.

In addition, the spacing rule for the plurality of windows is used to indicate how the plurality of windows are spaced. For example, the spacing rule for the plurality of windows may include window size information of each window of the plurality of windows and window size information of an interval between the windows.

In an embodiment, the spacing rule for the plurality of windows may be window indication information of each resource unit in a plurality of resource units included in a target window. The target window is a window from a start location of the first window and an end location of the last window. The target window includes a plurality of resource units, and window indication information of a resource unit is used to indicate whether the resource unit belongs to a sub-window.

The resource unit may include a time domain unit and/or a frequency domain unit. For example, the resource unit may be a subframe or a slot in time domain. For example, if window indication information of a resource unit is 1, it indicates that a time resource in which the resource unit is located belongs to a sub-window. If window indication information of a resource unit is 0, it indicates that a time resource in which the resource unit is located does not belong to a sub-window.

Optionally, if the first configuration information includes the indication information of the available sidelink resource, before the first configuration information is transmitted, an auxiliary sensing operation may be further performed to obtain the indication information of the available sidelink resource, and then the first configuration information including the indication information of the available sidelink resource is transmitted.

In other words, the communication device may determine, by performing the auxiliary sensing operation, an available sidelink resource required by the data, and configure the determined available sidelink resource for the terminal, to reserve the available sidelink resource for the terminal. In this way, availability of an available sidelink resource can be ensured.

According to a second aspect, an information configuration apparatus is provided, and the information configuration apparatus has a function of implementing a behavior of the information configuration method in the first aspect. The information configuration apparatus includes at least one module, and the at least one module is configured to implement the information configuration method provided in the first aspect.

According to a third aspect, an information configuration apparatus is provided. A structure of the information configuration apparatus includes a processor and a memory. The memory is configured to store a program that supports the information configuration apparatus in performing the information configuration method provided in the first aspect, and store data used to implement the information configuration method described in the first aspect. The processor is configured to execute the program stored in the memory. The information configuration apparatus may further include a communication bus, and the communication bus is configured to establish a connection between the processor and the memory.

According to a fourth aspect, a computer-readable storage medium is provided. The computer-readable storage medium stores instructions. When the instructions are run on a computer, the computer is enabled to perform the information configuration method described in the first aspect.

According to a fifth aspect, a computer program product that includes instructions is provided. When the instructions are run on a computer, the computer is enabled to perform the information configuration method described in the first aspect.

According to a sixth aspect, a chip is provided. The chip includes at least one processor. The at least one processor is coupled to a communication interface, the at least one processor is configured to run a computer program or instructions stored in a memory, to implement the method described in the first aspect, and the communication interface is used to communicate with a module other than the chip.

Technical effects achieved in the second aspect, the third aspect, the fourth aspect, the fifth aspect, and the sixth aspect are similar to technical effects achieved by using corresponding technical means in the first aspect. Details are not described herein again.

According to a seventh aspect, an information configuration method is provided, applied to a terminal. The method includes receiving first configuration information, and executing, based on the first configuration information when a sleep window conflicts with a sensing window, a conflict resolution policy indicated by the first configuration information in a target sleep window that conflicts with the sensing window. The target sleep window is a part or all of a sleep window of the terminal that conflicts with a sensing window of the terminal.

In this embodiment of this disclosure, the first configuration information is received, and the corresponding conflict resolution policy is executed based on the first configuration information when the sleep window conflicts with the sensing window. This resolves a problem that the terminal does not know whether to perform the sensing operation or enter a sleep state when the sleep window conflicts with the sensing window, and ensures smooth implementation of a data service while reducing power consumption overheads of a device.

Optionally, the first configuration information is received in the following several implementations.

In a first implementation, before DRX configuration information or sensing window configuration information is received, the first configuration information is separately received.

It should be noted that the DRX configuration information is used to indicate the sleep window, and the sensing window configuration information is used to indicate the sensing window.

In a second implementation, second configuration information is received. The second configuration information includes the first configuration information and one of the following configuration information: DRX configuration information or sensing window configuration information.

In other words, the second configuration information may be received, and the first configuration information may be obtained from the second configuration information.

In a third manner, before DRX configuration information or sensing window configuration information is received, first sub-information is received, and third configuration information is received. The third configuration information includes second sub-information and one or more of the following information: the DRX configuration information or the sensing window configuration information.

The first sub-information is a part of the first configuration information, and the second sub-information is another part of the first configuration information.

In other words, the part of the first configuration information is separately received, and the other part of the first configuration is received based on the DRX configuration information or the sensing window configuration information.

It should be noted that the terminal may receive the first configuration information transmitted by a communication device in a directional manner, or may receive the first configuration information transmitted by a communication device in a non-directional manner, for example, receive, by using an antenna, the first configuration information broadcast by the communication device. A manner of receiving the first configuration information by the terminal is not limited in this embodiment of this disclosure.

Optionally, the executing a conflict resolution policy in a target sleep window based on the first configuration information includes the following several cases:

In a first case, if the first configuration information includes sensing operation indication information, the sensing operation is performed in the target sleep window based on the first configuration information.

In other words, the sensing operation is performed instead of entering the sleep state in the target sleep window, to avoid a conflict between the sensing operation and the sleep state in the target sleep window.

In a second case, if the first configuration information includes indication information of a sub-window, the sensing operation is performed in the sub-window of the target sleep window, and the sleep state is entered in a window other than the sub-window in the target sleep window, or the sleep state is entered in the sub-window determined from the target sleep window, and the sensing operation is performed in a window other than the sub-window in the target sleep window.

In other words, the sensing operation is performed in a part of the target sleep window, and the sleep state is entered in another part of the target sleep window, to avoid a conflict between the sensing operation and the sleep state in the target sleep window.

It should be noted that, it may be determined, based on a standard specification, a rule negotiated with the communication device in advance, or related information carried in the first configuration information, whether to perform the sensing operation in the sub-window of the target sleep window and enter the sleep state in the window other than the sub-window, or enter the sleep state in the sub-window of the target sleep window and perform the sensing operation in the window other than the sub-window.

In a possible implementation, if the first configuration information further includes first window indication information, the terminal may perform, based on the indication information of the sub-window, the sensing operation in the sub-window determined from the target sleep window, and enter the sleep state in the window other than the sub-window in the target sleep window. If the first configuration information further includes second window indication information, the terminal may enter the sleep state in the sub-window determined from the target sleep window based on the indication information of the sub-window, and perform the sensing operation in the window other than the sub-window in the target sleep window.

The first window indication information is used to indicate that the sub-window is a sensing sub-window, that is, used to indicate to perform the sensing operation in the sub-window associated with the target sleep window, and enter the sleep state in the window other than the sub-window in the target sleep window. The second window indication information is used to indicate that the sub-window is a sleep sub-window, that is, used to indicate to enter the sleep state in the sub-window associated with the target sleep window, and perform the sensing operation in the window other than the sub-window in the target sleep window.

In a third case, when the first configuration information includes indication information of an available sidelink resource, the sleep state is entered in the target sleep window, and data transmission is performed based on the available sidelink resource.

In other words, a reserved available sidelink resource may be determined based on the first configuration information. In this way, when the sensing operation cannot be performed in the target sleep window, there is still an available sidelink resource for data transmission, thereby ensuring smooth implementation of a data service.

Optionally, when the first configuration information includes the indication information of the sub-window, the sub-window may be alternatively determined from the target sleep window based on the indication information of the sub-window.

In a possible implementation, determining the sub-window from the target sleep window based on the indication information of the sub-window includes the following cases.

In a first case, when the indication information of the sub-window includes window size information, the sub-window is determined from the target sleep window based on the window size information by using a start location of the target sleep window as a start location or by using an end location of the target sleep window as an end location.

In a second case, when the indication information of the sub-window includes start location information and end location information, the sub-window is determined from the target sleep window based on the start location information and the end location information.

In a third case, when the indication information of the sub-window includes start location information of the first window and end location information of the last window in a plurality of windows that are spaced from each other, and a spacing rule for the plurality of windows, the plurality of windows are determined from the target sleep window based on the start location information of the first window, the end location information of the last window, and the spacing rule for the plurality of windows, and are used as the sub-window.

In a possible implementation, if the spacing rule for the plurality of windows is window indication information of each resource unit in a plurality of resource units included in a target window, where the target window is a window from a start location of the first window to an end location of the last window, and the window indication information of each resource unit is used to indicate whether the resource unit belongs to a sub-window, the plurality of windows may be determined from the target window based on the window indication information of each resource unit in the plurality of resource units included in the target window. The target window may be determined based on the start location information of the first window and the end location information of the last window.

In this embodiment of this disclosure, the indication information of the sub-window may include different information forms. The sub-window is determined based on different indication information of the sub-window, so that flexibility and availability of configuring the sub-window can be improved, and the sub-window can be used in different information configuration scenarios.

According to an eighth aspect, an information configuration apparatus is provided, and the information configuration apparatus has a function of implementing a behavior of the information configuration method in the seventh aspect. The information configuration apparatus includes at least one module, and the at least one module is configured to implement the information configuration method provided in the seventh aspect.

According to a ninth aspect, an information configuration apparatus is provided. A structure of the information configuration apparatus includes a processor and a memory. The memory is configured to store a program that supports the information configuration apparatus in performing the information configuration method provided in the seventh aspect, and store data used to implement the information configuration method described in the seventh aspect. The processor is configured to execute the program stored in the memory. The information configuration apparatus may further include a communication bus, and the communication bus is configured to establish a connection between the processor and the memory.

According to a tenth aspect, a computer-readable storage medium is provided. The computer-readable storage medium stores instructions. When the instructions are run on a computer, the computer is enabled to perform the information configuration method described in the seventh aspect.

According to an eleventh aspect, a computer program product that includes instructions is provided. When the instructions are run on a computer, the computer is enabled to perform the information configuration method described in the seventh aspect.

According to a twelfth aspect, a chip is provided. The chip includes at least one processor. The at least one processor is coupled to a communication interface, the at least one processor is configured to run a computer program or instructions stored in a memory, to implement the method described in the seventh aspect, and the communication interface is used to communicate with a module other than the chip.

Technical effects achieved in the eighth aspect, the ninth aspect, the tenth aspect, the eleventh aspect, and the twelfth aspect are similar to technical effects achieved by using corresponding technical means in the seventh aspect. Details are not described herein again.

According to a thirteenth aspect, a communication system is provided. The communication system includes a communication device and a terminal. The communication device is configured to implement the method according to the first aspect, and the terminal is configured to implement the method according to the seventh aspect.

DESCRIPTION OF EMBODIMENTS

Figure 1:
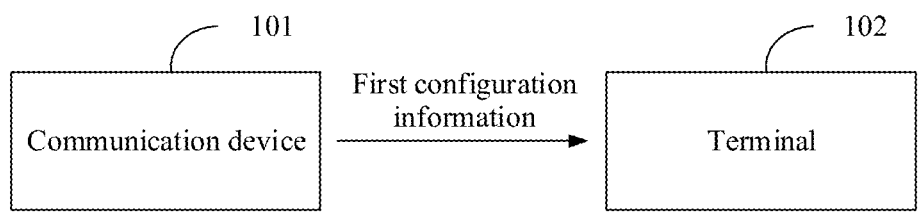
FIG. 1 is a schematic diagram of an information configuration system according to an embodiment of this disclosure.

The following describes the technical solutions in embodiments of this disclosure with reference to the accompanying drawings in embodiments of this disclosure. In descriptions in embodiments of this disclosure, "/" means "or" unless otherwise specified. For example, AB may represent A or B. In this specification, "and/or" describes only an association relationship for describing associated objects and represents that three relationships may exist. For example, A and/or B may represent the following three cases: only A exists, both A and B exist, and only B exists. In addition, in the descriptions in embodiments of this disclosure, "a plurality of" means two or more.

The terms "first" and "second" mentioned below are merely intended for a purpose of description, and shall not be understood as an indication or implication of relative importance or implicit indication of a quantity of indicated technical features. Therefore, a feature limited by "first" or "second" may explicitly or implicitly include one or more features.

It should be noted that in this disclosure, the term such as "an example" or "for example" is used to represent giving an example, an illustration, or descriptions. Any embodiment or design scheme described as an "example" or "for example" in this disclosure should not be explained as being more preferred or having more advantages than another embodiment or design scheme. Exactly, use of the word "example", "for example" or the like is intended to present a relative concept in a specific manner.

A network architecture and a service scenario described in embodiments of this disclosure are intended to describe the technical solutions in embodiments of this disclosure more clearly, and do not constitute a limitation on the technical solutions provided in embodiments of this disclosure. A person of ordinary skill in the art may know that, with the evolution of the network architecture and emergence of new service scenarios, the technical solutions provided in embodiments of this disclosure are also applicable to similar technical problems.

"A plurality of" in this disclosure refers to two or more than two. The term "and/or" describes an association relationship between associated objects and represents that three relationships may exist. For example, A and/or B may represent the following three cases: only A exists, both A and B exist, and only B exists. A and B may be in a singular or plural form. The character "/" generally indicates an "or" relationship between the associated objects.

Steps in an information configuration method provided in embodiments of this disclosure are merely examples. Not all steps are mandatory, or not all content in each piece of information or each message is mandatory. The steps or the content may be added or reduced as required in a use process. A same step or steps or messages having a same function in embodiments of this disclosure may be mutually referenced in different embodiments.

A system architecture and a service scenario described in embodiments of this disclosure are intended to describe the technical solutions in embodiments of this disclosure more clearly, and do not constitute a limitation on the technical solutions provided in embodiments of this disclosure. A person of ordinary skill in the art may know that, with the evolution of the network architecture and the emergence of new service scenarios, the technical solutions provided in embodiments of this disclosure are also applicable to similar technical problems.

The technical solutions in embodiments of this disclosure may be used in various communication systems, for example, a Global System for Mobile Communication (GSM), an Evolved Universal Terrestrial Radio Access (E-UTRA) system, a Universal Mobile Telecommunications System (UMTS) and an evolved version of the UMTS, a Long-Term Evolution (LTE) communication system and various versions based on LTE evolution, a 5th generation (5G) communication system, and a next generation communication system such as a New Radio (NR) communication system. In addition, the foregoing communication system may be further used in a future-oriented communication technology to which the technical solutions provided in embodiments of this disclosure are applicable.

FIG. 1 is a schematic diagram of a communication system according to an embodiment of this disclosure. As shown in FIG. 1, the information configuration system includes a communication device 101 and a terminal 102. The communication device 101 and the terminal 102 may be connected through a wired network or a wireless network.

The communication device 101 is a device for configuring information, and may be a network device or a terminal. The terminal 102 is a device for which information is configured.

In addition, the terminal 102 may perform sidelink communication with another terminal.

The network device may include a base station, an access point, or the like. For example, the communication device 101 is a base station, and the base station performs information configuration for the terminal. Alternatively, the communication device 101 is a terminal, and the terminal performs information configuration for the other terminal.

The terminal in embodiments of this disclosure is a device having a wireless communication function, and may be deployed on land, including indoor, outdoor, handheld, or vehicle-mounted. Alternatively, the terminal may be deployed on water (for example, on a ship), or may be deployed in the air (for example, on an airplane, a balloon, or a satellite). The terminal, also referred to as user equipment (UE), a mobile station (MS), a mobile terminal (MT), a terminal device, and the like, is a device that provides voice and/or data connectivity for a user. For example, the terminal includes a handheld device or a vehicle-mounted device having a wireless connection function. The terminal may be a mobile phone, a tablet computer, a notebook computer, a palmtop computer, a mobile Internet device (MID), a wearable device (for example, a smartwatch, a smart band, or a pedometer), a vehicle-mounted device (for example, an automobile, a bicycle, an electric vehicle, an aircraft, a ship, a train, or a high-speed train), a virtual reality (VR) device, an augmented reality (AR) device, a wireless terminal in industrial control, a smart home device (for example, a refrigerator, a television, an air conditioner, or an electricity meter), an intelligent robot, a workshop device, a wireless terminal in self driving, a wireless terminal in remote medical surgery, a wireless terminal in smart grid, a wireless terminal in transportation safety, a wireless terminal in smart city, a wireless terminal in smart home, a flight device (for example, an intelligent robot, a hot balloon, an uncrewed aerial vehicle, or an aircraft), or the like. In a possible application scenario of this disclosure, the terminal is a terminal that often operates on land, for example, a vehicle-mounted device. In this disclosure, for ease of description, a chip deployed in the foregoing device, for example, a system-on-a-chip (SOC), a baseband chip, or another chip having a communication function, may also be referred to as a terminal.

The terminal may be a vehicle having a corresponding communication function, a vehicle-mounted communication apparatus, or another embedded communication apparatus, or may be a handheld communication device of a user, including a mobile phone, a tablet computer, or the like.

For example, in embodiments of this disclosure, the terminal may alternatively be a wearable device. The wearable device may also be referred to as a wearable intelligent device, and is a general term of a wearable device that is intelligently designed and developed for daily wear by using a wearable technology, for example, glasses, gloves, a watch, clothing, and shoes. The wearable device is a portable device that can be directly worn on the body or integrated into clothes or an accessory of a user. The wearable device is not only a hardware device, but also implements a powerful function through software support, data exchange, and cloud interaction. Generalized wearable intelligent devices include full-featured and large-size devices that can implement complete or partial functions without depending on smartphones, such as smart watches or smart glasses, and devices that focus on only one type of application and need to work with other devices such as smartphones, such as various smart bands or smart jewelry for monitoring physical signs.

The network device is an entity that is used in combination with the terminal and that may be configured to transmit or receive a signal. For example, the network device may be an access point (AP) in a wireless local area network (WLAN), or may be an evolved NodeB (eNB, or eNodeB) in the long LTE, a relay station or an access point, or a vehicle-mounted device, a wearable device, and a network device in a 5G network (or NR) or a network device in a future evolved PLMN network. The network device in embodiments of this disclosure may be a base station. In an example, the network device 100 may be an evolved NodeB (eNB, or eNodeB) in a fourth generation communication technology (4G) system.

Figure 2:
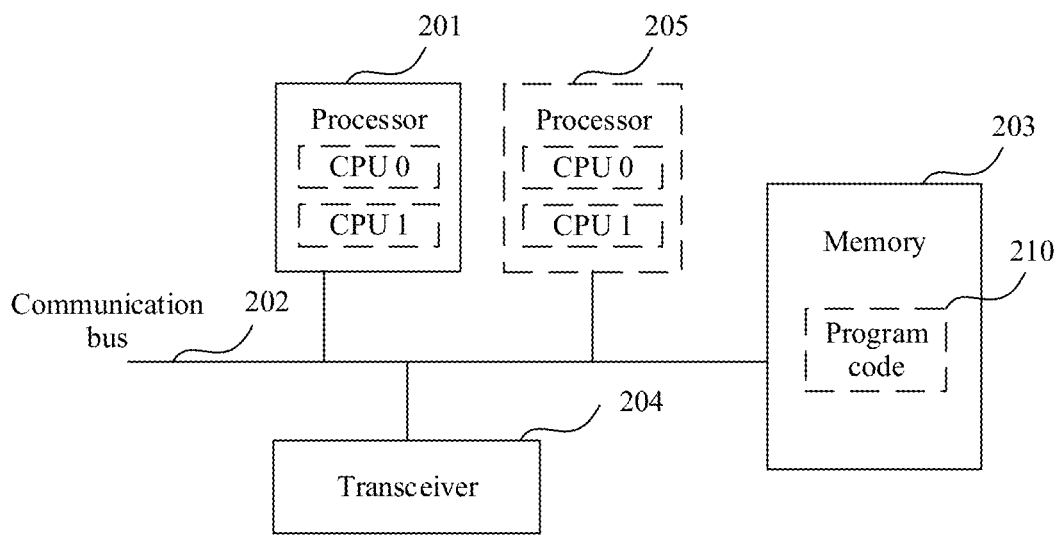
FIG. 2 is a schematic diagram of a structure of a communication device according to an embodiment of this disclosure.

FIG. 2 is a schematic diagram of a structure of a communication device according to an embodiment of this disclosure. The communication device may be the communication device 101 or the terminal 102 shown in FIG. 1. Refer to FIG. 2. The communication device includes at least one processor 201, a communication bus 202, and at least one transceiver 204.

The processor 201 may be a microprocessor (including a central processing unit (CPU) or the like), an application-specific integrated circuit (ASIC), or one or more integrated circuits configured to control program execution of the solutions of this disclosure.

The communication bus 202 may include a path for transferring information between the foregoing components.

Optionally, the communication device may further include a memory 203. The memory 203 may be a read-only memory (ROM), a random-access memory (RAM), an electrically erasable programmable ROM (EEPROM), an optical disc (including a compact disc (CD) ROM (CD-ROM), a CD, a laser disc, a DIGITAL VERSATILE DISC (DVD), a BLU-RAY disc, and the like), a magnetic disk storage medium, another magnetic storage device, or any other medium that can be used to carry or store expected program code in a form of an instruction or a data structure and that can be accessed by a computer, but is not limited thereto. The memory 203 may exist independently, and is connected to the processor 201 by using the communication bus 202. The memory 203 may alternatively be integrated with the processor 201.

The transceiver 204 may use any apparatus such as a transceiver, and is configured to communicate with another device or a communication network such as the Ethernet, a radio access network (RAN), or a WLAN.

During specific implementation, in an embodiment, the processor 201 may include one or more CPUs, for example, a CPU 0 and a CPU 1 shown in FIG. 2.

During specific implementation, in an embodiment, the communication device may include a plurality of processors, for example, the processor 201 and a processor 205 shown in FIG. 2. Each of the processors may be a single-core processor, or may be a multi-core processor. The processor herein may be one or more devices, circuits, and/or processing cores configured to process data (for example, computer program instructions).

During specific implementation, in an embodiment, the communication device may further include an output device and an input device. The output device communicates with the processor 201, and may display information in a plurality of manners. For example, the output device may be a liquid-crystal display (LCD), a light-emitting diode (LED) display device, a cathode-ray tube (CRT) display device, a projector, or the like. The input device communicates with the processor 201, and may receive an input from a user in a plurality of manners. For example, the input device may be a mouse, a keyboard, a touchscreen device, or a sensing device.

The communication device may be a general-purpose communication device or a dedicated communication device. During specific implementation, the communication device may be a desktop computer, a portable computer, a network server, a palmtop computer, a mobile phone, a tablet computer, a wireless terminal device, a communication device, or an embedded device. A type of the communication device is not limited in this embodiment of this disclosure.

The memory 203 is configured to store program code 210 for executing the solutions of this disclosure. The processor 201 is configured to execute the program code 210 stored in the memory 203. The communication device may implement, by using the processor 201 and the program code 210 in the memory 203, the information configuration method provided in the following embodiment in FIG. 7.

The information configuration method provided in embodiments of this disclosure may be used in a sidelink communication scenario, for example, used in a sidelink communication scenario in the Internet of Things. In the sidelink communication, two terminals may directly transmit data to each other, without transmitting the data to a network device for forwarding to greatly reduce a data delay.

The sidelink communication may be LTE-based sidelink communication, may be 5G NR-based sidelink communication, or may be sidelink communication based on another communication network. This is not limited in this embodiment of this disclosure.

Figure 3:
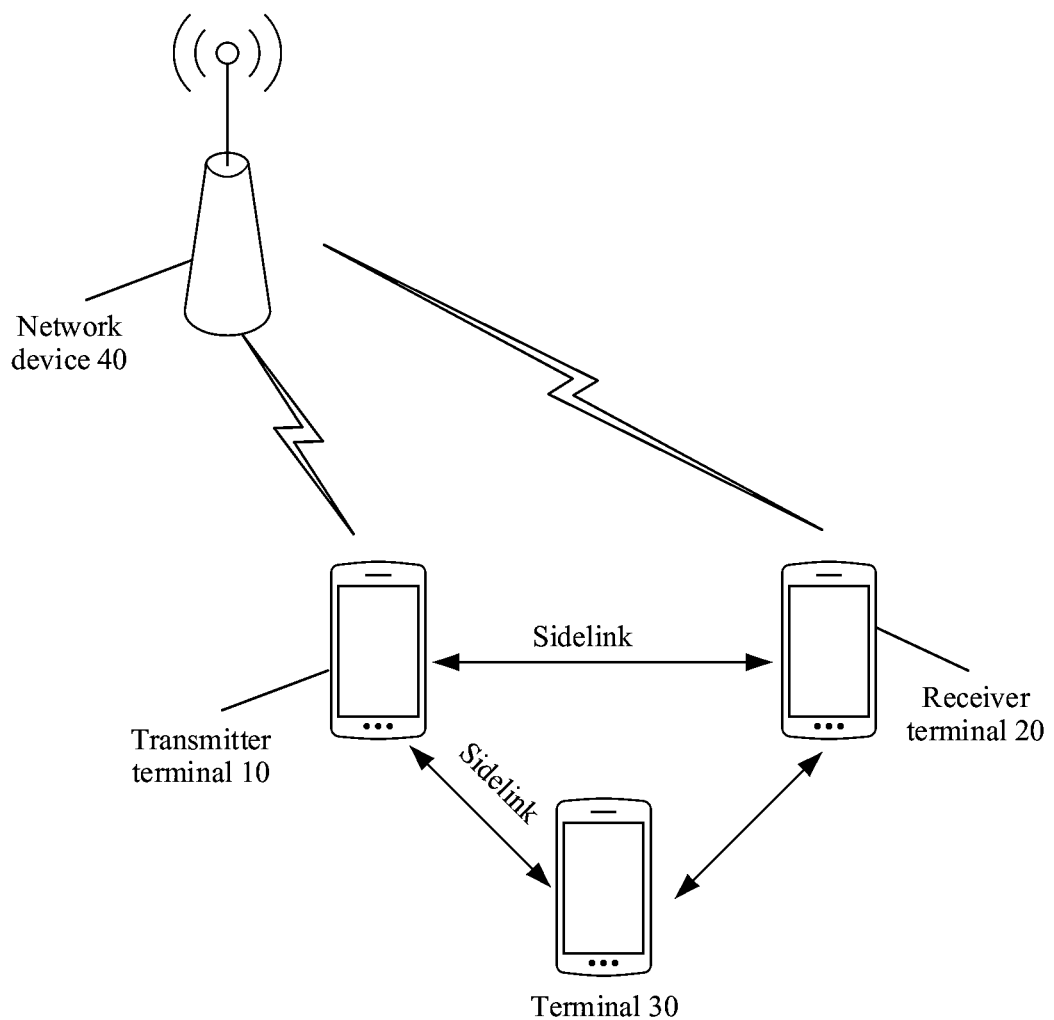
FIG. 3 is a schematic diagram of a communication system according to an embodiment of this disclosure.

A sidelink communication scenario is shown in FIG. 3. FIG. 3 is a schematic diagram of a communication system according to an embodiment of this disclosure. The system includes a transmitter terminal (Tx terminal) 10, a receiver terminal (Rx terminal) 20, and a terminal 30. It should be understood that FIG. 3 shows one transmitter terminal 10, one receiver terminal 20, and one terminal 30.

In this embodiment of this disclosure, the receiver terminal 20 is a terminal that can receive service data transmitted by the transmitter terminal 10. Certainly, in addition to receiving the service data, the receiver terminal 20 may also transmit service data. The transmitter terminal 10 refers to a terminal that can transmit service data. Certainly, in addition to transmitting the service data, the transmitter terminal 10 may also receive service data transmitted by another device (for example, the terminal 30 or a network device 40). The transmitter terminal and the receiver terminal are relative concepts.

It may be understood that in this embodiment of this disclosure, the transmitter terminal 10 and the receiver terminal 20 can perform sidelink communication, and one or more of the transmitter terminal 10 and the receiver terminal 20 use a power saving mode, that is, the transmitter terminal 10 or the receiver terminal 20 switches between a sleep state and an activated state in one cycle.

The terminal 30 is configured to configure a DRX configuration and/or a time resource used to sense a sidelink resource (a sensing window) for the transmitter terminal 10 or the receiver terminal 20. In FIG. 3, an example in which the receiver terminal 20 and the transmitter terminal 10 communicate with the same terminal 30 is used. In an actual process, terminals configuring the DRX configuration and/or the time resource used to sense the sidelink resource for the receiver terminal 20 and the transmitter terminal 10 may be different terminals. For example, the terminal 30 configures the DRX configuration and/or the time resource used to sense the sidelink resource for the transmitter terminal 10. For example, the terminal 30 configures the DRX configuration and/or the time resource used to sense the sidelink resource for the receiver terminal 20. It should be noted that the terminal configuring the DRX configuration for the receiver terminal 20 (or the transmitter terminal 10) and the terminal configuring the time resource used to sense the sidelink resource may be a same terminal, or may be different terminals. This is not limited in this embodiment of this disclosure.

It should be noted that when the DRX configuration and/or the time resource used to sense the sidelink resource of the receiver terminal 20 are/is configured by the transmitter terminal 10, the terminal 30 may be omitted.

In a possible implementation, the communication system may further include the network device 40. There is a second interface (for example, a Uu interface) between the network device 40 and the transmitter terminal 10, the receiver terminal 20, and the terminal 30. A user plane of the Uu interface is mainly configured to transmit user data, and a control plane is configured to transmit related signaling, and set up, reconfigure, and release various mobile communication radio bearer services.

The network device 40 is configured to configure the DRX configuration (for example, a sleep window and an activated window) and/or the time resource used to sense the sidelink resource for the transmitter terminal 10 or the receiver terminal 20. When the communication system includes the network device 40, if both the time resource used to sense the sidelink resource and the DRX configuration of the transmitter terminal 10 (or the receiver terminal 20) are configured by the network device 40, the terminal 30 may also be omitted. Certainly, when the communication system includes the network device 40, if the DRX configuration of the transmitter terminal 10 (or the receiver terminal 20) is configured by the network device 40, the time resource used to sense the sidelink resource of the transmitter terminal 10 (or the receiver terminal 20) may be configured by the terminal 30. In this case, the terminal 30 needs to be reserved. Certainly, the terminal 30 may alternatively configure the DRX configuration for the transmitter terminal 10 (or the receiver terminal 20), and the network device 40 configures the time resource used to sense the sidelink resource for the transmitter terminal 10 (or the receiver terminal 20). This is not limited in this embodiment of this disclosure. The transmitter terminal 10 and the receiver terminal 20 may be connected to different network devices. In FIG. 1, an example in which the transmitter terminal 10 and the receiver terminal 20 are connected to a same network device is used.

There is a first interface used for direct communication between the transmitter terminal 10 and the receiver terminal 20, between the transmitter terminal 10 and the terminal 30, or between the receiver terminal 20 and the terminal 30. The first interface may be referred to as a PC5 interface. A transmission link that is over the PC5 interface and that is used for communication between terminals may be referred to as a sidelink. For example, the PC5 interface may use a dedicated frequency band (for example, 5.9 gigahertz (GHz)).

To improve security and intelligence of a transportation system, an idea of an intelligent transportation system gradually emerges. In a recent phase, development of the intelligent transportation system mainly focuses on the field of intelligent road transportation systems, namely, V2X. V2X communication includes vehicle-to-vehicle (V2V) communication, vehicle-to-infrastructure (V2I) communication, and vehicle-to-pedestrian (V2P) communication. V2X applications improve driving safety, reduce congestion and vehicle energy consumption, and improve traffic efficiency, for example, communication with an infrastructure such as a traffic light, a campus, and a railway crossing. The vehicle-to-everything system is a sidelink transmission technology based on LTE V2V or new radio V2V. Different from a manner in which communication data is received or transmitted by a network device in a conventional LTE system or the NR, the vehicle-to-everything system uses a terminal-to-terminal direct communication manner.

With the evolution of communication technologies, the 3rd Generation Partnership Project (3GPP) introduces support for V2V sidelink and V2X sidelink services in the LTE during release 14 and release 15, to extend a 3GPP platform to other Internet of Things industries such as automobiles. In addition, the LTE V2X is supplemented by using new radio V2X, to implement an advanced V2X service and support interworking with the LTE V2X.

Figure 4:
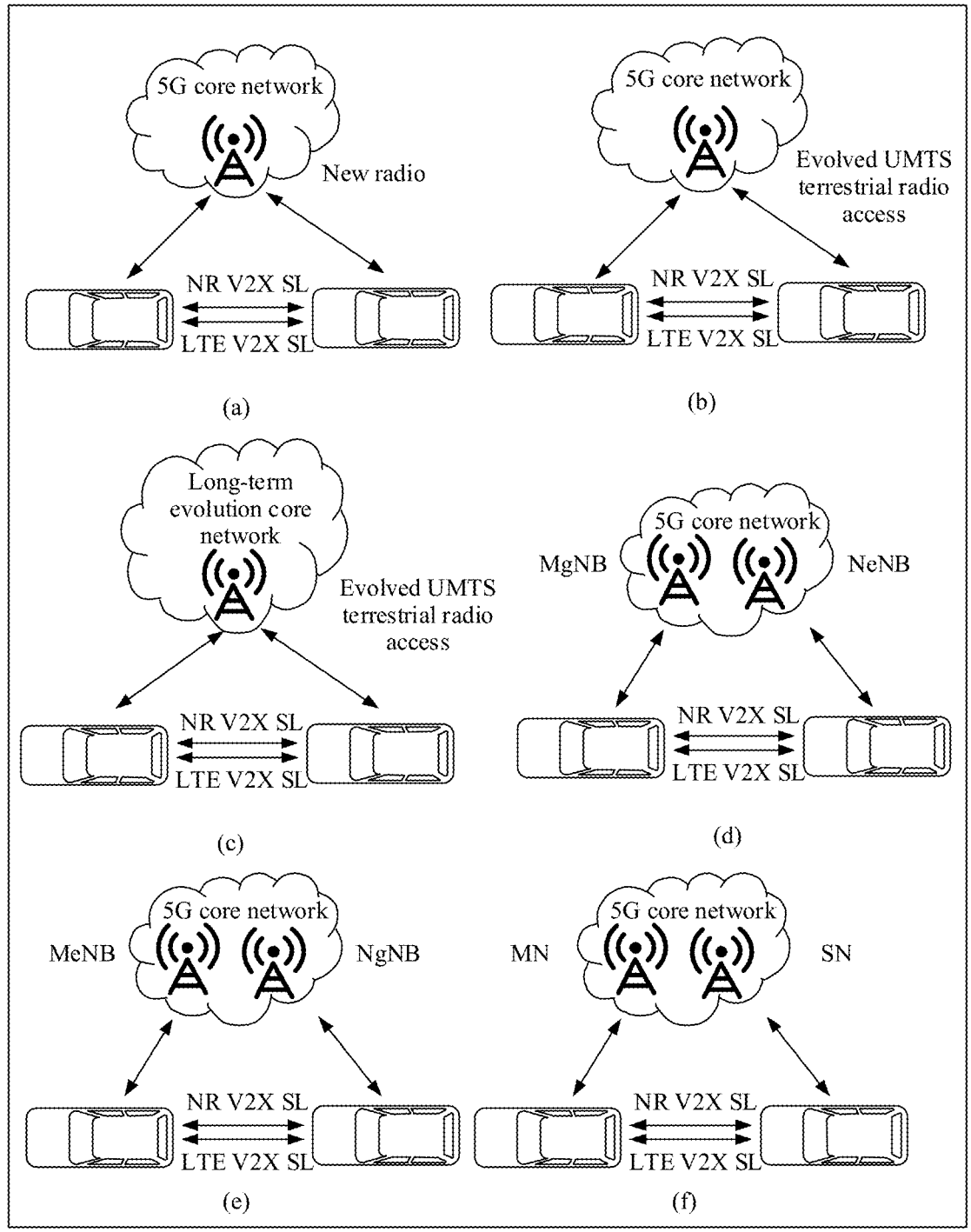
FIG. 4 is a diagram of an architecture of a vehicle-to-everything (V2X) sidelink according to an embodiment of this disclosure.

FIG. 4 is a diagram of an architecture of a V2X sidelink according to an embodiment of this disclosure. As shown in FIG. 4, the V2X sidelink architecture includes two types: independent deployment and dual connectivity deployment, and covers the following scenarios. (a) in FIG. 4, (b) in FIG. 4, (c) in FIG. 4, (d) in FIG. 4, (e) in FIG. 4, and (f) in FIG. 4 respectively correspond to a scenario 1, a scenario 2, a scenario 3, a scenario 4, a scenario 5, and a scenario 6. The scenario 1 to the scenario 3 are independent deployment scenarios, and the scenario 4 to the scenario 6 are dual connectivity deployment scenarios, namely, multi-radio access technology dual connectivity (MR-DC) scenarios.

Independent deployment is a working mode in which a terminal is connected to one base station, for example, a working mode in which the terminal is connected to one 4G base station or one 5G base station in the scenario 1 to the scenario 3. Dual connectivity deployment is a working mode in which a terminal is connected to two base stations, for example, a working mode in which the terminal is connected to one 4G base station and one 5G base station in the scenario 4 to the scenario 6. A multi-radio access technology (MR) refers to a plurality of radio access technologies, such as evolved-UTRA (E-UTRA) and the NR.

As shown in FIG. 4, in the scenario 1, the terminal (a vehicle-machine equipment or a vehicle-mounted terminal in a vehicle shown in FIG. 4) accesses a 5G core network (5GC) by using NR, and is connected to a NR NodeB (gNB), to implement an NR V2X SL and an LTE V2X SL. In the scenario 2, the terminal accesses the 5GC by using the E-UTRA, and is connected to a next generation-evolved NodeB (ng-eNB), to implement the NR V2X SL and the LTE V2X SL. In the scenario 3, the terminal accesses an Evolved Packet Core (EPC) network by using the E-UTRA, and is connected to an evolved NodeB (eNB), to implement the NR V2X SL and the LTE V2X SL. In the scenario 1 to the scenario 3, the gNB, the ng-eNB, and the eNB separately manage or configure a terminal that performs V2X communication over an LTE sidelink and an NR sidelink.

In an actual process, the terminal may access a plurality of network devices (for example, a primary base station or a secondary base station).

The primary base station may be a first base station accessed by the terminal in a random access process. The primary base station is responsible for establishing a control plane connection with a core network control plane entity, transmitting a signaling message, and determining whether to create a secondary base station for the terminal. In addition, the primary base station may further select a secondary base station for the terminal. The primary base station supports signaling plane access management and user plane offloading of the terminal.

The secondary base station is a second base station other than the primary base station, and is a node configured to provide an additional radio resource for the terminal. There may be no direct control plane connection between the secondary base station and the core network control plane entity. The secondary base station supports user plane offloading of the terminal.

In an example, in this embodiment of this disclosure, the secondary base station and the primary base station may be base stations of a same network standard. For example, network standards respectively corresponding to the secondary base station and the primary base station are evolved NodeBs (eNBs or eNodeBs) in a 4G system. For another example, network standards respectively corresponding to the secondary base station and the primary base station may be next generation NodeBs (gNBs) in an NR system.

In another example, in this embodiment of this disclosure, the secondary base station and the primary base station may be base stations of different network standards. For example, a network standard corresponding to the primary base station is an eNB in the 4G system, and a network standard corresponding to the secondary base station is a gNB in the NR system. Alternatively, a network standard corresponding to the primary base station is the gNB in the NR system, and a network standard corresponding to the secondary base station is the eNB in the 4G system.

As shown in FIG. 4, in the scenario 4, the terminal is separately connected to a main gNB (MgNB) and a secondary eNB (SeNB), to implement the NR V2X SL and the LTE V2X SL. In the scenario 5, the terminal is separately connected to a main eNB (MeNB) and a secondary eNB (SgNB), to implement the NR V2X SL and the LTE V2X SL. In the scenario 6, the terminal is separately connected to a main node (MN) and a secondary node (SN), to implement the NR V2X SL and the LTE V2X SL. In the scenario 4 to the scenario 6, the main node manages or configures the terminal that performs V2X communication over the LTE sidelink and the NR sidelink.

When the solutions described in embodiments of this disclosure are applied to a V2X scenario, the solutions may be applied to the following fields: unmanned driving, automated driving (such as automated driving systems (ADS)), driver assistance (such as advanced driver assistance systems (ADAS)), intelligent driving, connected driving, intelligent network driving, and car sharing. Certainly, the solutions described in embodiments of this disclosure may also be applied to interaction between a band and a mobile phone, and interaction between VR glasses and a mobile phone.

The NR may support sidelink unicast, multicast, and broadcast transmission in a coverage area, outside the coverage area, and in a partial coverage area. Unicast refers to a one-to-one communication mode between terminals. That is, one terminal communicates with another specific terminal. Multicast refers to a one-to-one group communication mode between terminals. That is, one terminal communicates with a group of terminals. Broadcast refers to a one-to-all communication mode between terminals. That is, one terminal communicates with all other terminals. In sidelink communication, a physical channel used for transmission includes a PSCCH, a PSSCH, and a physical sidelink feedback channel (PSFCH).

It should be noted that, in a communication network such as the NR, a sidelink needs to transmit data based on a resource pool. The resource pool is a logical concept. One resource pool includes a plurality of resources, and the resource includes one or more of a time domain resource and a frequency domain resource. Any resource in the resource pool is used to transmit data. When performing data transmission, the terminal needs to first determine a sidelink resource from the resource pool, and then transmit data based on the determined sidelink. There are mainly two manners of determining a resource. In a first manner, the terminal selects, under control of the network device based on indication information of the network device, a resource from the resource pool as a sidelink resource for data transmission. In a second manner, the terminal autonomously randomly selects a resource from the resource pool as a sidelink resource for data transmission. The sidelink resource may be a resource used to transmit data or a resource used to receive data.

In an example, the manner of determining the resource includes the following two manners.

Mode 1: Resource Allocation Mode Scheduled by a Network.

In the mode 1, the terminal transmits data with the network device in an RRC connected mode. In this case, the network device communicating with the terminal may schedule, for the terminal, a sidelink resource used to transmit sidelink service data. For example, the terminal transmits a scheduling request (SR) and a sidelink buffer status report (BSR) to the network device. The sidelink BSR is used to determine a sidelink communication data amount of the terminal. The network device may determine the sidelink communication data amount of the terminal based on the sidelink BSR, and schedule, for the terminal, the sidelink resource required for transmitting the sidelink service data. The network device schedules, by using a configured sidelink radio network temporary identity (SL-RNTI), the sidelink resource used for sidelink communication.

Mode 2: Resource Selection Mode Autonomously Selected by the Terminal.

In the mode 2, the terminal selects a sidelink resource from the resource pool (which usually includes one or more sidelink resources). For example, when the terminal is within a network coverage area, the resource pool is a resource broadcast by the network device in system information. When the terminal is out of the network coverage area, the resource pool is a resource preconfigured for the terminal. The resource pool may be a specific resource pool for the terminal, that is, only the terminal can select a sidelink resource from the resource pool. Alternatively, the resource pool may be a resource pool shared by a plurality of terminals including the terminal, that is, a terminal other than the terminal may also select a resource from the resource pool. For the latter, when the terminal autonomously selects a resource from the resource pool, the terminal may perform sensing on the resource pool to select the sidelink resource.

In a case in which the terminal autonomously selects a resource for data transmission, the terminal may determine, by performing a sensing operation, a transmission resource required by data. The sensing operation may be implemented by using a transmit (TX) sensing technology. In a scenario in which the transmission resource required by the data is determined by using the sensing operation, a sensing window usually needs to be preconfigured for the terminal, so that the terminal performs the sensing operation in the sensing window.

For example, the information configuration method provided in this embodiment of this disclosure may be applied to the mode 2 of the sidelink communication. In the mode 2, the terminal autonomously selects the resource for data transmission. For example, an available sidelink resource required by the data is determined by performing the sensing operation within the sensing window.

The sensing operation refers to collecting sensing information, determining a channel occupancy status based on the sensing information, and determining the available sidelink resource based on the channel occupancy status. The sensing information includes channel measurement information and the like. The channel measurement information may include an RSRP, an RSSI, and the like of the PSSCH.

Figure 5:
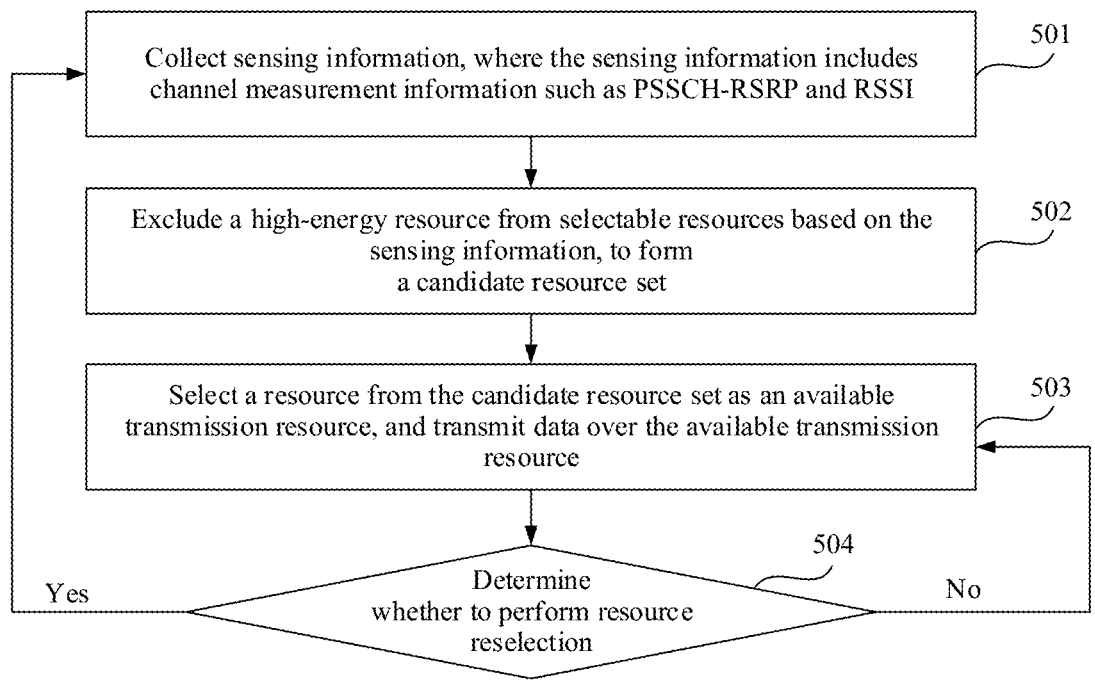
FIG. 5 is a schematic diagram of a sensing operation according to an embodiment of this disclosure.

In an example, FIG. 5 is a schematic diagram of a sensing operation according to an embodiment of this disclosure. As shown in FIG. 5, the sensing operation may include the following steps.

Step 501: Collect sensing information, where the sensing information includes channel measurement information such as PSSCH-RSRP and RSSI.

Step 502: Exclude a high-energy resource from selectable resources based on the sensing information, to form a candidate resource set.

Step 503: Select a resource from the candidate resource set as an available sidelink resource, and transmit data over the available sidelink resource.

Step 504: Determine whether to perform resource reselection.

If the resource reselection needs to be performed, return to step 501, to continue to collect sensing information, so as to exclude a high-energy resource from the selectable resources based on the sensing information, to form a candidate resource set, and then select an available sidelink resource from the resource candidate set. If the resource reselection does not need to be performed, return to step 503, to continue to use the available sidelink resource selected in step 503 for data transmission, that is, transmit data over the same sidelink resource in step 503.

For a process of performing the sensing operation by the terminal in this disclosure, refer to the description in FIG. 5.

A DRX technology is introduced in the sidelink communication, to reduce power consumption of the terminal. The DRX technology refers to a working mode in which a terminal turns on a receiver and enters an activated state only when necessary to receive downlink data and signaling and turns off the receiver and enters a sleep state in other time to stop receiving downlink data and signaling, to reduce power consumption of the terminal.

In a wireless network, when data needs to be transmitted, the terminal needs to monitor a PDCCH all the time, and receive and transmit the data based on an indication message transmitted by a network side. In this way, power consumption of the terminal and a data transmission delay are large. Therefore, 3GPP specifications introduce a DRX energy saving policy in an LTE system, which is defined in MAC of a physical layer.

Figure 6:
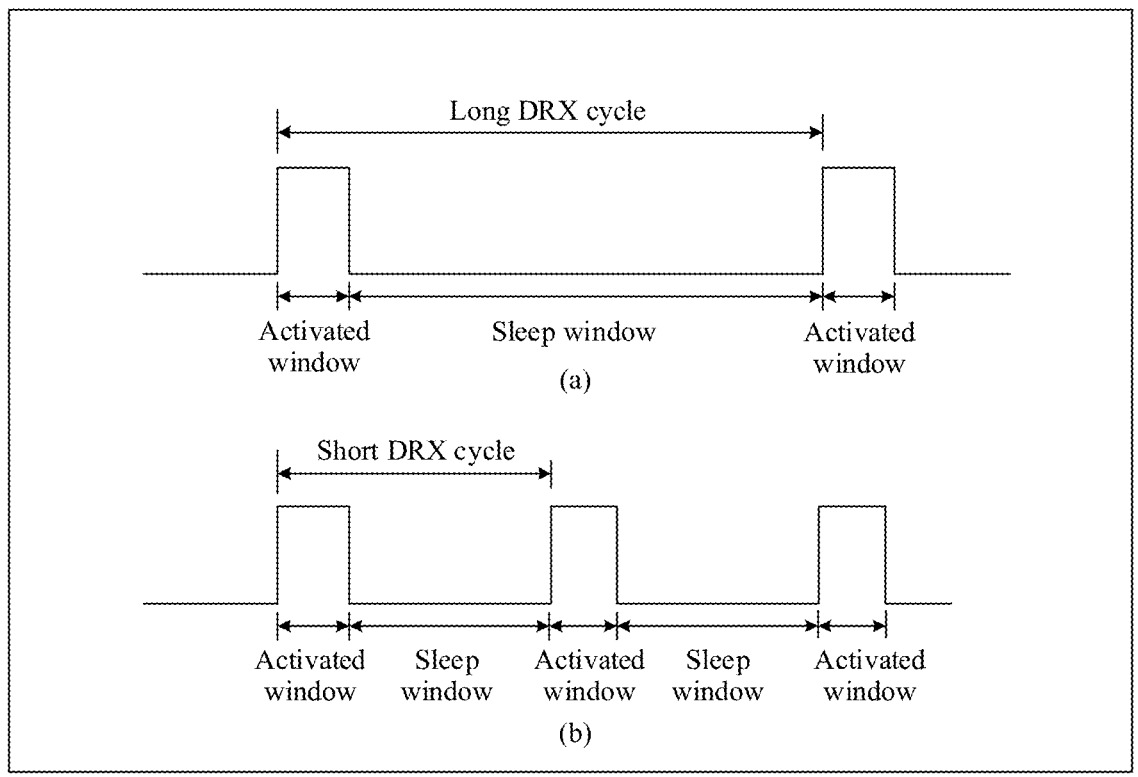
FIG. 6 is a schematic diagram of a DRX cycle according to an embodiment of this disclosure.

DRX means that the terminal turns on the receiver only when necessary to enter the activated state (or an active state), to receive downlink data and signaling, and turns off the receiver and enters the sleep state in other time (or an inactive state). When the terminal is in the sleep state, the terminal stops receiving the downlink data and signaling. The DRX is a working mode for the terminal to reduce power consumption. The DRX is classified into idle mode DRX and connected mode DRX. The idle mode DRX does not have RRC connections or dedicated bearers for the terminal. Therefore, the idle mode DRX is implemented by sensing a paging channel. The connected mode DRX refers to a DRX feature of the terminal in an RRC connected mode, and is implemented by monitoring the PDCCH and implemented by monitoring the PDCCH or the PSCCH. A schematic diagram of a DRX mechanism is shown in FIG. 6. In time domain, time is divided into continuous DRX cycles.

The DRX cycle includes an activated window and a sleep window. The activated window is also called an active period. The activated window is timed by a DRX on duration timer (drx-onDurationTimer). In the activated window, the terminal senses the PDCCH or the PSCCH. The sleep window is also referred to as an inactive period. In the sleep window, the terminal does not sense or receive a downlink signal, to reduce power consumption. The DRX on duration timer means that when a DRX cycle starts, in duration of on duration, namely, during running of the drx-onDuration-Timer, the terminal is in an activated state (also referred to as a wake-up state). The DRX cycle may include a short DRX cycle and a long DRX cycle. The long DRX cycle is generally an integer multiple of the short DRX cycle. FIG. 6 is a schematic diagram of a DRX cycle according to an embodiment of this disclosure. (a) in FIG. 6 represents a long DRX cycle, and (b) in FIG. 6 represents a short DRX cycle.

A typical application scenario of the DRX includes a service that is insensitive to a delay and does not require for data reception and transmission at most time, such as web browsing, email receiving, or a file transfer service based on a File Transfer Protocol (FTP), a service that generates a sparse packet, for example, presence services, a periodic and continuous packet service, such as a Voice over Internet Protocol (VoIP) service, and automatic neighbor relation (ANR) measurement.

Because the sensing window and the sleep window of the terminal are separately configured, the configured sensing window may conflict with the configured sleep window, that is, a window area of the sensing window overlaps a window area of the sleep window. In this case, the terminal does not know whether to perform the sensing operation or enter the sleep state. Consequently, the terminal cannot properly perform the sensing operation, and further cannot sense an available sidelink resource required for subsequent data transmission or smoothly implement a data service. To resolve this problem, an embodiment of this disclosure provides a method for configuring a conflict resolution policy for a terminal by using configuration information, so that the terminal executes the corresponding conflict resolution policy used when a sleep window conflicts with a sensing window, thereby resolving a problem of a conflict between the sleep window and the sensing window, and ensuring smooth implementation of a data service while reducing power consumption overheads of the terminal.

Interaction bodies of the information configuration method provided in embodiments of this disclosure are a communication device and a terminal. The communication device may be a base station or a terminal in the sidelink communication scenario, and the terminal may be a terminal in the sidelink communication scenario.

Figure 7:
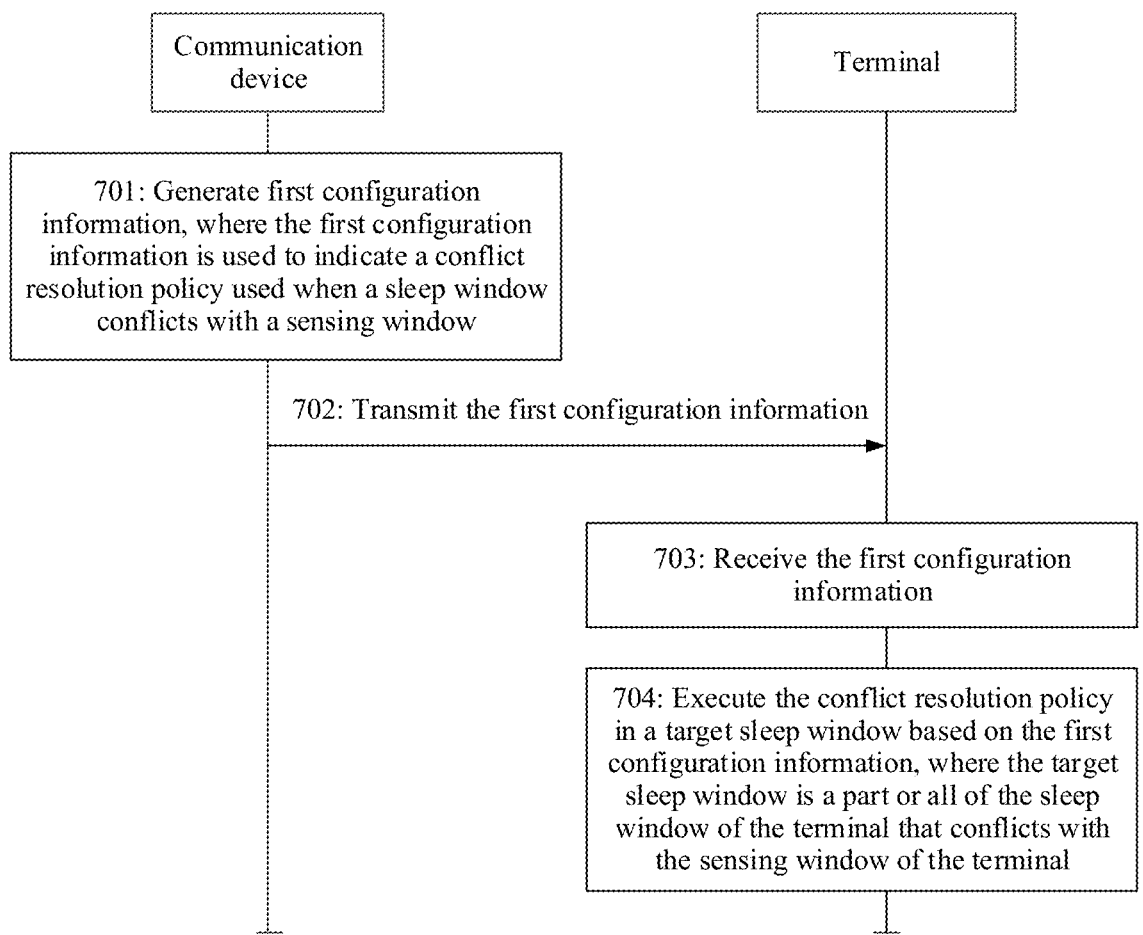
FIG. 7 is a flowchart of an information configuration method according to an embodiment of this disclosure.

FIG. 7 is a flowchart of an information configuration method according to an embodiment of this disclosure. Interaction bodies of the method are a communication device and a terminal. The communication device is a device for configuring information, and may be a network device, a terminal, or the like. The terminal is a device for which information is configured. As shown in FIG. 7, the method includes the following steps.

Step 701: The communication device generates first configuration information, where the first configuration information is used to indicate a conflict resolution policy used when a sleep window conflicts with a sensing window.

In this embodiment of this disclosure, to resolve a problem that the terminal does not know which operation to be performed when the sleep window conflicts with the sensing window, a method is provided to configure a conflict resolution policy for the terminal by the communication device based on configuration information, so that the terminal executes the corresponding conflict resolution policy used when the sleep window conflicts with the sensing window. However, before configuring the conflict resolution policy for the terminal, the communication device needs to first generate the first configuration information used to indicate the conflict resolution policy.

It should be noted that the conflict resolution policy is a policy used to resolve the problem of the conflict between the sleep window and the sensing window, and may be operation-related information on an operation that needs to be performed when the sleep window conflicts with the sensing window.

The sleep window is a time resource in which a sleep state needs to be entered, and the terminal is in the sleep state in the sleep window. For example, the sleep window may be configured based on DRX configuration information. For example, the communication device or another device other than the communication device configures the DRX configuration information for the terminal. The DRX configuration information is used to indicate the sleep window. For example, the DRX configuration information may include a DRX cycle, and the DRX cycle includes an activated window and a sleep window. Certainly, the sleep window may also be specified in a standard or negotiated by the communication device and the terminal. A configuration manner of the sleep window is not limited in this embodiment of this disclosure.

The sensing window is a time resource in which a sensing operation needs to be performed. The sensing operation is used to determine an available sidelink resource required by data. For example, the sensing operation refers to collecting sensing information, determining a channel occupancy status based on the sensing information, and determining an available sidelink resource based on the channel occupancy status. The sensing information includes channel measurement information and the like. The available sidelink resource includes an available transmitting resource or an available receiving resource. The available transmitting resource is used to transmit data, and the available receiving resource is used to receive data. The available sidelink resource may include a time domain resource and/or a frequency domain resource.

The sensing window may be configured based on sensing window configuration information. For example, the communication device or another device other than the communication device configures the sensing window configuration information for the terminal. The sensing window configuration information is used to indicate the sensing window. For example, the sensing window configuration information may include one or more of a sensing window cycle, time resource size information of the sensing window, and resource location information, and certainly may also include other sensing window related information. This is not limited in this embodiment of this disclosure. Certainly, the sensing window may also be specified in a standard or negotiated by the communication device and the terminal. A configuration manner of the sensing window is not limited in this embodiment of this disclosure.

In addition, the time resource is a resource area including a time domain resource and/or a frequency domain resource. For example, the time resource may include a resource area including a time domain resource and a full frequency domain resource, or a resource area including a time domain resource and a frequency domain resource.

In an example, the first configuration information may include one or more of the following information:

First type of information is sensing operation indication information.

It should be noted that the sensing operation indication information is used to indicate to perform the sensing operation in a target sleep window. The target sleep window is a part or all of the sleep window that conflicts with the sensing window. For example, the target sleep window is the sleep window that conflicts with the sensing window. Alternatively, the target sleep window is a part of the sleep window that conflicts with the sensing window, namely, a part of the sleep window that overlaps with the sensing window.

In the first type of information, the sensing operation indication information may indicate to perform the sensing operation instead of switching a device status to the sleep state in the target sleep window when the sleep window conflicts with the sensing window.

In this way, the target sleep window may be converted into the sensing window, and a function of the sleep window is no longer executed, to avoid a conflict between the sensing operation and the sleep state in the target sleep window.

A second type of information is indication information of a sub-window, where the sub-window is a window in the target sleep window.

It should be noted that the indication information of the sub-window may be resource location information of the sub-window, and is used to represent a time resource in which the sub-window is located. Alternatively, the indication information of the sub-window is location information of the sub-window in the target sleep window, and is used to represent a location of the sub-window in the target sleep window. The indication information of the sub-window may include indication information of time domain and/or frequency domain of the sub-window.

The sub-window is a window associated with the target sleep window, and is further a window associated with a part or all of the target sleep window. For example, the sub-window may be a part or all of the target sleep window, or a window that overlaps a part or all of the target sleep window. The configured sub-window may be a sensing sub-window in which the sensing operation needs to be performed, or may be a sleeping sub-window in which the sleep state needs to be entered.

The sensing operation needs to be performed in the sub-window associated with the target sleep window, and the sleep state needs to be entered in a window other than the sub-window in the target sleep window, or the sleep state needs to be entered in the sub-window associated with the target sleep window, and the sensing operation needs to be performed in a window other than the sub-window in the target sleep window. For example, the sensing operation needs to be performed in a sub-window in the target sleep window, and the sleep state needs to be entered in a window other than the sub-window in the target sleep window, or the sleep state needs to be entered in a sub-window associated with the target sleep window, and the sensing operation needs to be performed in a window other than the sub-window in the target sleep window.

If the sub-window is a sensing sub-window, the sensing operation needs to be performed in the sub-window associated with the target sleep window, and the sleep state needs to be entered in the window other than the sub-window in the target sleep window. In other words, the sub-window associated with the target sleep window is used as the sensing window in which the sensing operation is performed, and another part of the target sleep window is still used as the sleep window in which the sleep state is entered. In this way, a device receiving the indication information of the sub-window is enabled to perform the sensing operation in a part of the target sleep window, and enter the sleep state in another part of the target sleep window, to avoid the conflict between the sensing operation and the sleep state in the target sleep window.

If the sub-window is a sleep sub-window, the sleep state needs to be entered in the sub-window associated with the target sleep window, and the sensing operation needs to be performed in the window other than the sub-window in the target sleep window. In other words, the sub-window associated with the target sleep window is used as the sleep window in which the sleep state is entered, and another part of the target sleep window is used as the sensing window in which the sensing operation is performed. In this way, the device receiving the indication information of the sub-window is enabled to perform the sensing operation in a part of the target sleep window, and enter the sleep state in another part of the target sleep window, to avoid the conflict between the sensing operation and the sleep state in the target sleep window.

In an example, the indication information of the sub-window is used to indicate the sub-window. In addition, an action of a terminal that receives the indication information of the sub-window may be configured in a manner such as other configuration information, a standard specification, or negotiation in advance. That is, the terminal that receives the indication information of the sub-window is configured to perform the sensing operation in the sub-window associated with the target sleep window, and enter the sleep state in the window other than the sub-window in the target sleep window, or enter the sleep state in the sub-window associated with the target sleep window, and perform the sensing operation in the window other than the sub-window in the target sleep window.

In another example, the indication information of the sub-window can not only indicate the sub-window, but also can indicate the action of the terminal that receives the indication information of the sub-window, that is, indicate to perform the sensing operation in the sub-window associated with the target sleep window and enter the sleep state in the window other than the sub-window in the target sleep window, or enter the sleep state in the sub-window associated with the target sleep window, and perform the sensing operation in the window other than the sub-window in the target sleep window.

A third type of information is indication information of an available sidelink resource.

The available sidelink resource may include a time domain resource and/or a frequency domain resource, and is used to transmit data. The available sidelink resource is a sidelink resource required for data transmission when the sleep state is entered in the target sleep window. In other words, based on the indication information of the available sidelink resource, the terminal that receives the indication information of the available sidelink resource may be configured to enter the sleep state in the target sleep window, and transmit data based on the available sidelink resource indicated by the indication information of the available sidelink resource.

It should be noted that a time domain location of the available sidelink resource is usually after a time domain location of the target sleep window. In this way, the terminal can transmit data based on the available sidelink resource after the target sleep window ends. For example, the time domain location of the available sidelink resource is a time period T after a time domain end location of the target sleep window, where T≥0.

In an example, the indication information of the available sidelink resource is used to indicate the available sidelink resource. In addition, an action of the terminal that receives the indication information of the available sidelink resource may be configured in a manner such as other configuration information, a standard specification, or negotiation in advance. That is, the terminal that receives the indication information of the available sidelink resource is configured to enter the sleep state in the target sleep window, and transmit data based on the available sidelink resource indicated by the indication information of the available sidelink resource.

In another example, the indication information of the available sidelink resource is not only used to indicate the available sidelink resource, but may also be used to indicate the action of the terminal that receives the indication information of the available sidelink resource, that is, may also be used to indicate that the terminal is in the sleep state in the target sleep window, and transmits data based on the available sidelink resource indicated by the indication information of the available sidelink resource.

When the sleep window conflicts with the sensing window, the sensing operation may not be successfully performed in the sensing window that conflicts with the sleep window, and an available sidelink resource required for subsequent data transmission cannot be determined. Consequently, a data service cannot be performed smoothly. To resolve this problem, in this embodiment of this disclosure, the first configuration information may be configured for the terminal, to reserve an available sidelink resource for the terminal. In this way, when the terminal cannot perform the sensing operation in the target sleep window, there is still an available sidelink resource for data transmission, thereby ensuring smooth implementation of a data service.

Step 702: The communication device transmits the first configuration information.

In an example, the communication device may transmit the first configuration information in the following several implementations.

In a first implementation, the first configuration information is transmitted before the DRX configuration information or the sensing window configuration information is transmitted.

In an example, before the DRX configuration information or the sensing window configuration information is transmitted, the first configuration information may be transmitted by using RRC, a MAC CE, SCI, or the like.

In other words, in the first implementation, the first configuration information may be separately configured before the sleep window or the sensing window is configured, so that a change to a configuration process of the sleep window or the sensing window can be avoided, to improve reliability.

In a second implementation, second configuration information is transmitted, where the second configuration information includes the first configuration information and one or more of the following information: the DRX configuration information or sensing window configuration information.

In an example, the first configuration information may be carried in the DRX configuration information for transmission, or the first configuration information may be carried in the sensing window configuration information for transmission, or the second configuration information that carries the first configuration information, the DRX configuration information, and the sensing window configuration information is transmitted.

In other words, in the second implementation, the first configuration information may be transmitted based on the DRX configuration information and/or the sensing window configuration information. In this way, signaling overheads can be reduced.

In a third implementation, before the DRX configuration information or sensing window configuration information is transmitted, first sub-information is transmitted, and third configuration information is transmitted. The third configuration information includes second sub-information and one or more of the following information: the DRX configuration information or the sensing window configuration information.

The first sub-information is a part of the first configuration information, and the second sub-information is another part of the first configuration information In other words, in addition to the DRX configuration information or the sensing window configuration information, the part of the first configuration information is separately transmitted, and the other part of the first configuration information is transmitted based on the DRX configuration information or the sensing window configuration information. In this way, flexibility of information configuration can be improved.

It should be noted that the communication device may transmit the first configuration information to the terminal in a directional manner, for example, transmit the first configuration information to the terminal in a unicast or multicast manner, or may transmit the first configuration information in a non-directional manner, for example, in a broadcast manner. A manner of transmitting the first configuration information is not limited in this embodiment of this disclosure.

Step 703: The terminal receives the first configuration information.

The terminal may receive the first configuration information transmitted by the communication device, for example, receive, by using an antenna, the first configuration information broadcast by the communication device.

In an example, the communication device may receive the first configuration information in the following several implementations.

In a first implementation, before the DRX configuration information or the sensing window configuration information is received, the first configuration information is received.

In other words, in addition to a DRX configuration and a sensing window configuration, the first configuration information that is separately configured is received.

In a second implementation, the second configuration information is received, where the second configuration information includes the first configuration information and one or more of the following information: the DRX configuration information or the sensing window configuration information.

In other words, the second configuration information may be received, and the first configuration information may be obtained from the second configuration information.

In a third manner, before the DRX configuration information or the sensing window configuration information is received, the first sub-information is received, and the third configuration information is received. The third configuration information includes the second sub-information and one or more of the following information: the DRX configuration information or the sensing window configuration information.

The first sub-information is a part of the first configuration information, and the second sub-information is another part of the first configuration information In other words, the part of the first configuration information is separately received, and the other part of the first configuration is received based on the DRX configuration information or the sensing window configuration information.

Step 704: Execute the conflict resolution policy in the target sleep window based on the first configuration information, where the target sleep window is all or a part of the sleep window that is in the sleep window of the terminal and that conflicts with the sensing window of the terminal.

The sleep window of the terminal may include a plurality of target sleep windows, and the conflict resolution policy may be executed in each target sleep window, to avoid the conflict between the sensing operation and the sleep state.

In an example, executing the conflict resolution policy in the target sleep window based on the first configuration information may include the following several implementations.

In a first implementation, when the first configuration information includes the sensing operation indication information, the sensing operation is performed in the target sleep window based on the first configuration information.

In other words, the sensing operation is performed instead of entering the sleep state in the target sleep window, to avoid the conflict between the sensing operation and the sleep state in the target sleep window.

Figure 8:
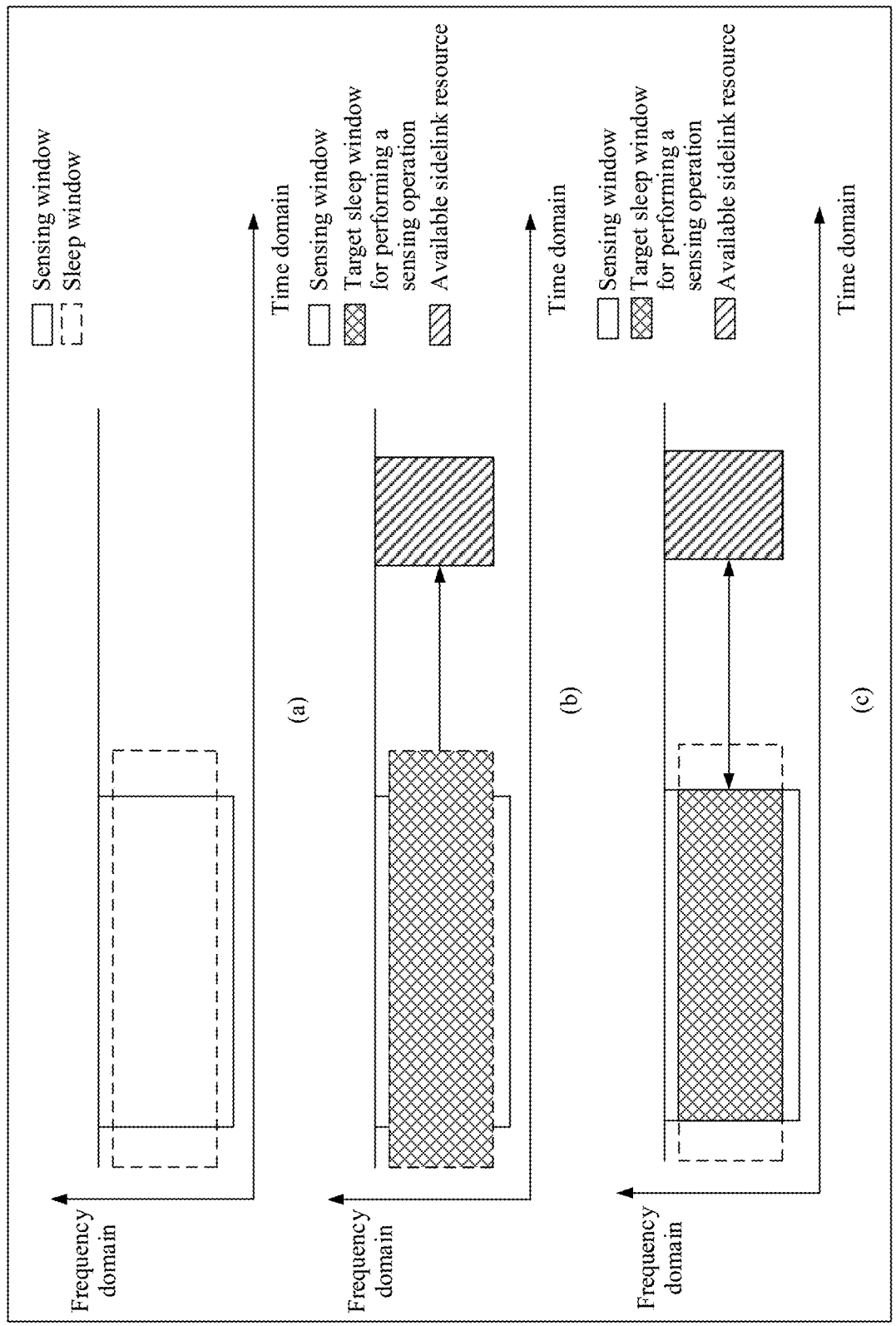
FIG. 8 is a schematic diagram of executing a conflict resolution policy based on sensing indication information according to an embodiment of this disclosure.

FIG. 8 is a schematic diagram of executing a conflict resolution policy based on sensing indication information according to an embodiment of this disclosure. In FIG. 8, a solid-line box is a sensing window, a dashed-line box is a sleep window, a cross shadow box is a target sleep window for performing a sensing operation, and a slashed box is an available sidelink resource. As shown in (a) in FIG. 8, in the conventional technology, when the sleep window conflicts with the sensing window, in some windows that conflict with each other, the terminal does not know whether to perform the sensing operation or switch to an idle mode. Consequently, the terminal cannot properly perform the sensing operation, and further cannot sense an available sidelink resource required for subsequent data transmission or smoothly implement a data service.

In this embodiment of this disclosure, as shown in (b) in FIG. 8 and (c) in FIG. 8, after the terminal receives the first configuration information including the sensing operation indication information, when the sleep window conflicts with the sensing window, the terminal may perform the sensing operation in the target sleep window, and may sense, by performing the sensing operation in the target sleep window, an available sidelink resource required by data. In (b) in FIG. 8, the target sleep window is a sleep window that conflicts with the sensing window. In (c) in FIG. 8, the target sleep window is a part of the sleep window that conflicts with the sensing window.

By transmitting the sensing operation indication information, the terminal may be indicated to perform, when the sleep window conflicts with the sensing window, the sensing operation instead of switching a device status to the sleep state in the sleep window that conflicts with the sensing window. This avoids a problem of a conflict between a sensing operation and a sleep state in a target sleep window, and ensures smooth implementation of a data service while reducing power consumption overheads of a device.

In a second implementation, if the first configuration information includes the indication information of the sub-window, the sensing operation is performed in the sub-window of the target sleep window, and the sleep state is entered in the window other than the sub-window in the target sleep window, or the sleep state is entered in the sub-window in the target sleep window, and the sensing operation is performed in the window other than the sub-window in the target sleep window.

The second implementation is described in detail in the following embodiment in FIG. 10. Details are not described herein.

In a third implementation, if the first configuration information includes the indication information of the available sidelink resource, the sleep state is entered in the target sleep window, and data transmission is performed based on the available sidelink resource after the sleep state ends.

Figure 9:
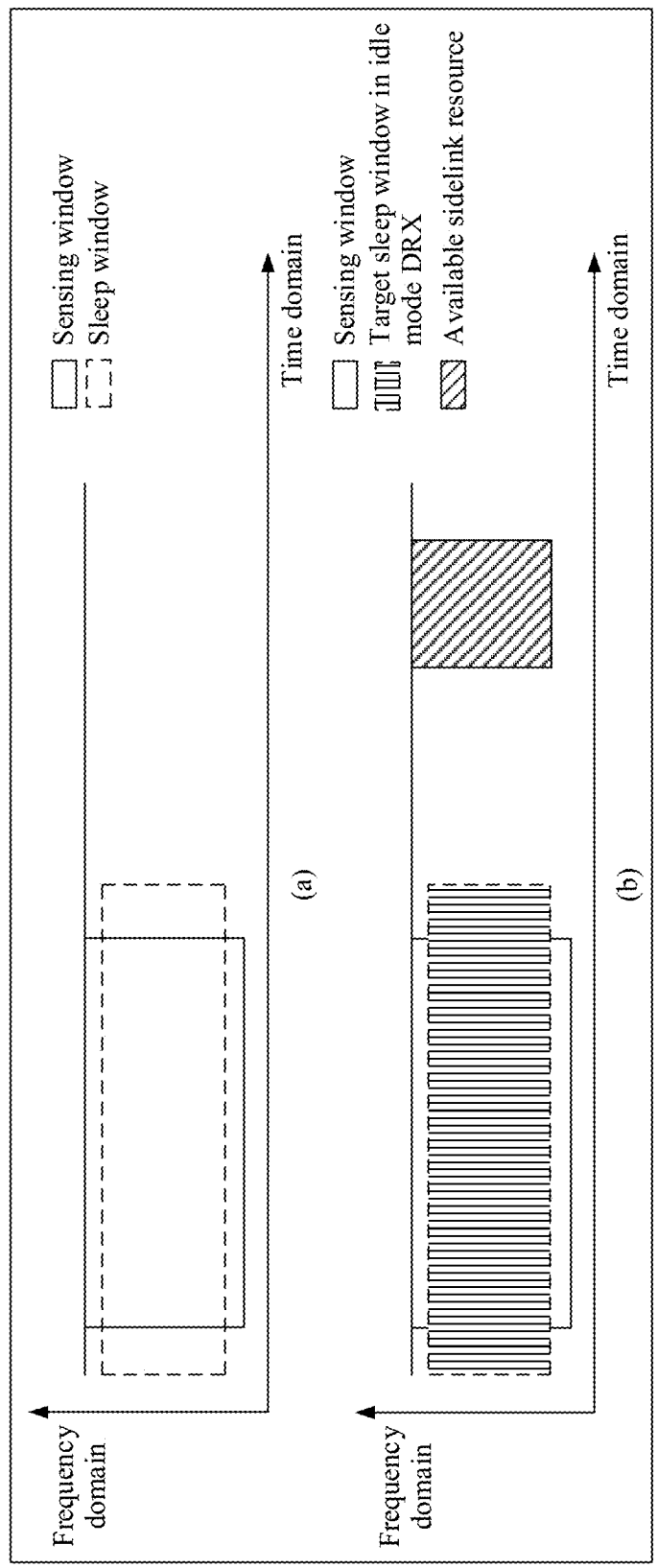
FIG. 9 is another schematic diagram of executing a conflict resolution policy based on an available sidelink resource according to an embodiment of this disclosure.

FIG. 9 is another schematic diagram of executing a conflict resolution policy based on an available sidelink resource according to an embodiment of this disclosure. In FIG. 9, a solid-line box is a sensing window, a dashed-line box is a sleep window, a vertical-line box is a target sleep window in which a sleep state is entered, and a slashed box is an available sidelink resource. As shown in (a) in FIG. 9, in the conventional technology, when the sleep window conflicts with the sensing window, in some windows that conflict with each other, the terminal does not know whether to perform the sensing operation or switch to an idle mode. Consequently, the terminal cannot properly perform the sensing operation, and further cannot sense an available sidelink resource required for subsequent data transmission or smoothly implement a data service. As shown in (b) in FIG. 9, in this embodiment of this disclosure, after receiving the first configuration information including the indication information of the available sidelink resource, the terminal may enter the sleep state instead of performing the sensing operation in the target sleep window when the sleep window conflicts with the sensing window. After the sleep state ends, the terminal transmits data on the configured available sidelink resource.

It should be noted that, if the indication information of the available sidelink resource is configured for the terminal, in a multicast or broadcast scenario, available sidelink resources that can be distinguished from each other need to be further configured for devices in a group. In other words, different available sidelink resources are configured for the devices in the group. In an example, when an available sidelink resource is configured for each device in the group, the available sidelink resource of the device in the group may be associated with a device identifier of the device in the group.

In an example, if the communication device is a terminal, before the communication device transmits the indication information of the available sidelink resource to the terminal, the communication device may further perform an auxiliary sensing operation for the terminal, to determine the available sidelink resource of the terminal by using the auxiliary sensing operation, and configure the determined available sidelink resource for the terminal based on the first configuration information. In this way, when the sleep window conflicts with the sensing window, the terminal may enter the sleep state in the target sleep window that conflicts with the sensing window based on the indication information of the available sidelink resource, and then transmit data based on an available sidelink resource configured by a first terminal.

In other words, in a scenario in which the first terminal performs information configuration for a second terminal, an available sidelink resource configured by the first terminal for the second terminal may be determined by the first terminal by performing an auxiliary sensing operation. In addition, the second terminal may further reserve a receiving resource, to receive, by using the reserved receiving resource, first configuration information transmitted by the first terminal.

In a third implementation, the available sidelink resource may be reserved for the terminal by transmitting the indication information of the available sidelink resource. In this way, even if the terminal is in the sleep state in the target sleep window that conflicts with the sensing window, and does not perform the sensing operation, the terminal can transmit data based on the reserved available sidelink resource. This avoids a problem of a conflict between the sensing operation and the sleep state in the target sleep window, and ensures smooth implementation of a data service while reducing power consumption overheads of a device.

It should be noted that this embodiment of this disclosure is applicable to a scenario such as unicast, multicast, or broadcast.

In this embodiment of this disclosure, the conflict resolution policy used when the sleep window conflicts with the sensing window may be configured for the terminal by transmitting the first configuration information, so that the terminal executes the corresponding conflict resolution policy used when the sleep window conflicts with the sensing window. This resolves a problem that the terminal does not know whether to perform the sensing operation or enter the sleep state when the sleep window conflicts with the sensing window, and ensures smooth implementation of a data service while reducing power consumption overheads of a device.

The following describes the information configuration method provided in this embodiment of this disclosure by using an example in which the first configuration information includes the indication information of the sub-window.

Figure 10:
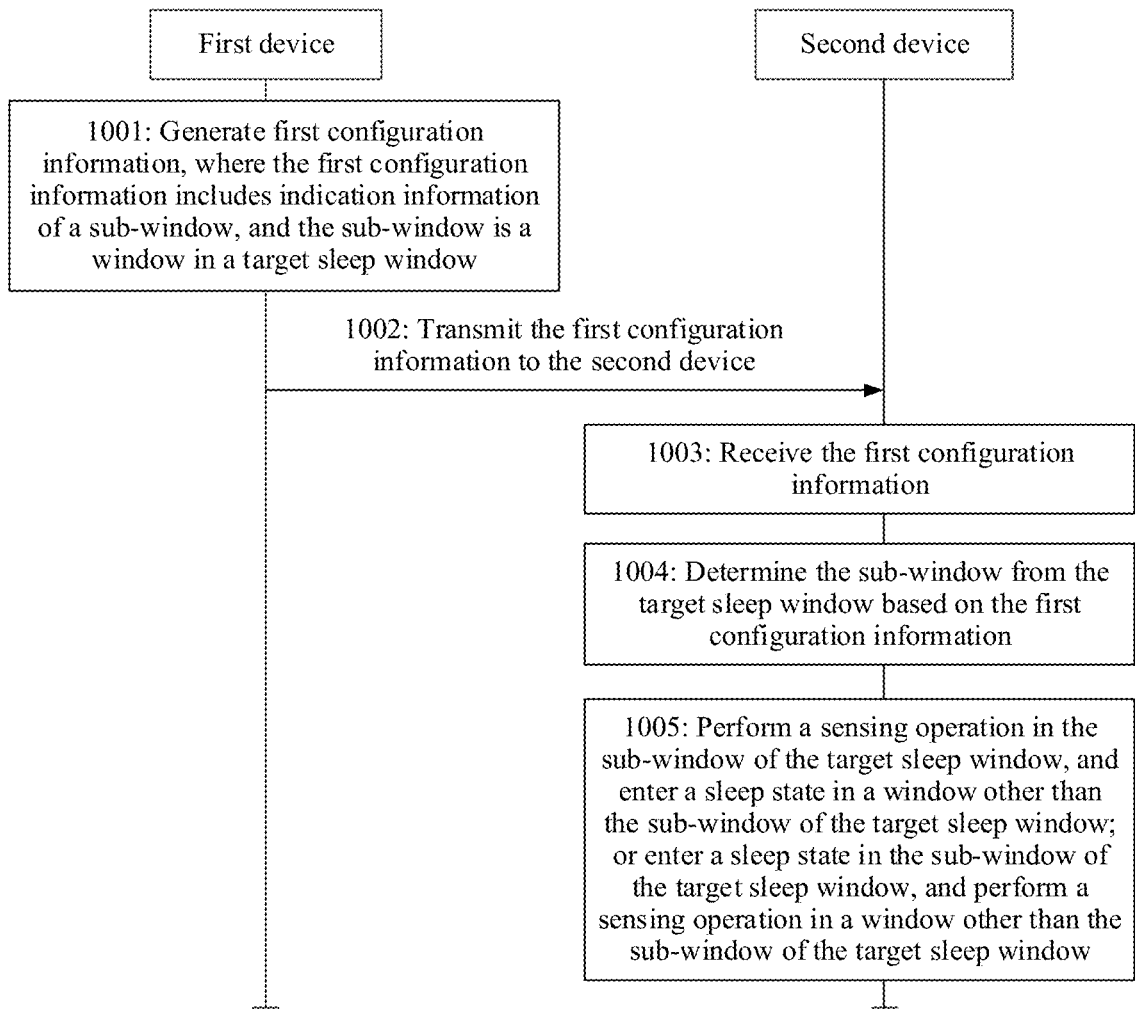
FIG. 10 is a flowchart of another information configuration method according to an embodiment of this disclosure.

FIG. 10 is a flowchart of another information configuration method according to an embodiment of this disclosure. Interaction bodies of the method are a communication device and a terminal. As shown in FIG. 10, the method includes the following steps.

Step 1001: The communication device generates first configuration information, where the first configuration information includes indication information of a sub-window, and the sub-window is a window in a target sleep window.

It should be noted that the target sleep window is a part or all of the sleep window that conflicts with the sensing window. The sub-window is a window associated with the target sleep window, and is further a window associated with a part or all of the target sleep window. For example, the sub-window is the part or all of the target sleep window, or is a window that overlaps the part or all of the target sleep window.

The indication information of the sub-window is used to indicate the sub-window. The indication information of the sub-window may be resource location information of the sub-window, and is used to represent a time resource in which the sub-window is located. Alternatively, the indication information of the sub-window is location information of the sub-window in the target sleep window, and is used to represent a location of the sub-window in the target sleep window. The indication information of the sub-window may include indication information of time domain and/or frequency domain of the sub-window.

In addition, the indication information of the sub-window may be further used to indicate to perform the sensing operation in a part of the target sleep window and enter the sleep state in another part of the target sleep window. In this way, a device receiving the indication information of the sub-window is enabled to perform the sensing operation in the part of the target sleep window, and enter the sleep state in the other part, to avoid the conflict between the sensing operation and the sleep state in the target sleep window.

For example, the indication information of the sub-window is used to indicate to perform the sensing operation in the sub-window associated with the target sleep window and enter the sleep state in a window other than the sub-window in the target sleep window. Alternatively, the indication information of the sub-window is used to indicate to enter the sleep state in the sub-window associated with the target sleep window and perform the sensing operation in a window other than the sub-window in the target sleep window.

In an example, the indication information of the sub-window includes one or more of the following information:
  (1) Window size information of the sub-window. A start location of the sub-window is a start location of the target sleep window, or an end location of the sub-window is an end location of the target sleep window.

In the first type of information, the sub-window is a part of the target sleep window at the front or a part of the target sleep window at the rear.

The window size information of the sub-window is used to indicate a window size of the sub-window. The window size of the sub-window may include a size of the sub-window in time domain and/or a size of the sub-window in frequency domain.

In an example, the window size information of the sub-window may include duration T, and is used to indicate to use the duration T that uses a start time of the target sleep window as a start time as a sub-window, or use the duration T that uses an end time of the target sleep window as an end time as a sub-window. T≥0.

It should be noted that whether the start location of the target sleep window is used as the start location of the sub-window, or the end location of the target sleep window is used as the end location of the sub-window may be specified in a standard, or may be negotiated by the communication device and the terminal in advance, or may be configured by using configuration information. This is not limited in this embodiment of this disclosure.

In an example, in addition to the window size information of the sub-window, the indication information of the sub-window may further include first indication information or second indication information. The first indication information is used to indicate the start location of the sub-window, and the start location of the sub-window is the start location of the target sleep window. The second indication information is used to indicate the end location of the sub-window, and the end location of the sub-window is the end location of the target sleep window.

(2) Start location information and end location information of the sub-window.

In the second type of information, the sub-window is a part or all of the target sleep window, and may be a part of the target sleep window at the front or a part of the target sleep window at the rear, or may be a part of the target sleep window in the middle.

The start location information and the end location information of the sub-window are used to determine the time resource in which the sub-window is located. In an example, the start location information and the end location information of the sub-window may include time domain location information and/or frequency domain location information. For example, if the target sleep window is a full frequency domain window, the start location information and the end location information of the sub-window may include start location information and end location information in time domain.

In another example, the start location information and the end location information of the sub-window may also be start location information and end location information of the sub-window in the target sleep window. For example, the start location information of the sub-window may be relative location information or distance information between a start location of the sub-window and a start location of the target sleep window, and the end location information of the sub-window may be relative location information or distance information between an end location of the sub-window and an end location of the target sleep window.

(3) Start location information of the first window in a plurality of windows that are spaced from each other and included in the sub-window, end location information of the last window in the plurality of windows, and a spacing rule for the plurality of windows.

In the third type of information, the sub-window is a plurality of windows that are spaced from each other in the target sleep window. The indication information of the sub-window includes the start location information of the first window, and the end location information of the last window in the plurality of windows, and the spacing rule for the plurality of windows.

It should be noted that the start location information of the first window and the end location information of the last window may include time domain location information and/or frequency domain location. For example, the target sleep window is a full frequency domain window, the start location information of the first window is start location information in time domain, and the end location information of the last window is end location information in time domain.

Alternatively, the start location information of the first window may be start location information in the target sleep window, and the end location information of the last window may be end location information in the target sleep window. For example, the start location information of the first window may be relative location information or distance information between a start location of the first window and a start location of the target sleep window, and the end location information of the last window may be relative location information or distance information between an end location of the last window and an end location of the target sleep window.

In addition, the spacing rule for the plurality of windows is used to indicate how the plurality of windows are spaced.

For example, the spacing rule for the plurality of windows may include window size information of each window of the plurality of windows and window size information of an interval between the windows. For another example, the spacing rule for the plurality of windows may be window indication information of each resource unit included in a target window. The target window is a window from the start location of the first window and the end location of the last window. The target window includes a plurality of resource units, and the resource unit may include a time domain unit and/or a frequency domain unit. For example, the resource unit may be a subframe or a slot in time domain. Window indication information of the resource unit is used to indicate whether the resource unit belongs to a sub-window. For example, if window indication information of a resource unit is 1, it indicates that the resource unit belongs to a sub-window. If window indication information of a resource unit is 0, it indicates that the resource unit does not belong to a sub-window.

Table 1 is an example description of a spacing rule for a plurality of windows according to an embodiment of this disclosure. As shown in Table 1, it is assumed that a target window includes 10 slots in time domain, the spacing rule for the plurality of windows may include window indication information of each of the 10 slots. For the 10 slots, if window indication information of a slot is 1, it indicates that the slot belongs to a sub-window. If window indication information of a slot is 0, it indicates that the slot does not belong to a sub-window. As shown in Table 1, a slot 1 and a slot 2 belong to a sub-window, a slot 3 and a slot 4 do not belong to a sub-window, a slot 5 and a slot 6 belong to a sub-window, a slot 7 and a slot 8 do not belong to a sub-window, and a slot 9 and a slot 10 belong to a sub-window. In this way, the 10 slots may be divided into three windows that are spaced from each other.

TABLE 1

| Slot 1 | Slot 2 | Slot 3 | Slot 4 | Slot 5 | Slot 6 | Slot 7 | Slot 8 | Slot 9 | Slot 10 |
| --- | --- | --- | --- | --- | --- | --- | --- | --- | --- |
| 1 | 1 | 0 | 0 | 1 | 1 | 0 | 0 | 1 | 1 |

In an example, in addition to the indication information of the sub-window, the first configuration information may further include first window indication information or second window indication information.

The first window indication information is used to indicate that the sub-window is a sensing sub-window, and the sensing sub-window is a sub-window in which the sensing operation needs to be performed. Correspondingly, the indication information of the sub-window is used to indicate to perform the sensing operation in the sub-window associated with the target sleep window and enter the sleep state in a window other than the sub-window in the target sleep window.

The second window indication information is used to indicate that the sub-window is a sleep sub-window, and the sleep sub-window is a sub-window in which the sleep state needs to be entered. Correspondingly, the indication information of the sub-window is used to indicate to enter the sleep state the sub-window associated with the target sleep window and perform the sensing operation in a window other than the sub-window in the target sleep window.

In a possible implementation, the first window indication information and the second window indication information may alternatively be separately transmitted outside the indication information of the sub-window. For example, the first configuration information is transmitted based on DRX configuration information, where the first configuration information includes the indication information of the sub-window. Before the first configuration information is transmitted based on the DRX configuration information, the first window indication information or the second window indication information is transmitted by using RRC, a MAC CE, an SCI, or the like.

Step 1002: The communication device transmits the first configuration information to the terminal.

In other words, the communication device may transmit the first configuration information to the terminal based on the DRX configuration information.

Step 1003: The terminal receives the first configuration information.

Step 1004: The terminal determines the sub-window from the target sleep window based on the indication information of the sub-window included in the first configuration information.

The operation of determining the sub-window from the target sleep window based on the indication information of the sub-window may include the following several implementations.

In a first implementation, if the indication information of the sub-window includes the window size information, the sub-window is determined from the target sleep window based on the window size information by using the start location of the target sleep window as a start location or by using the end location of the target sleep window as an end location.

Figure 11:
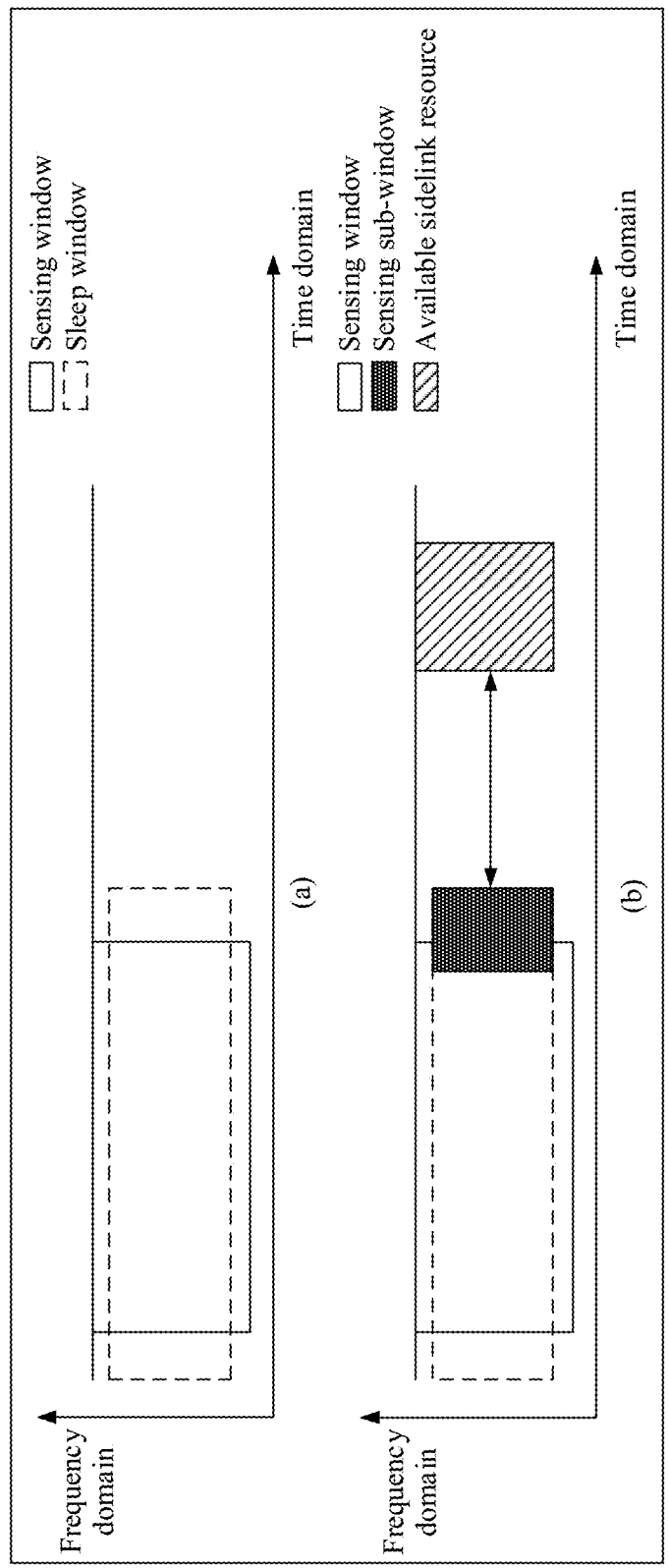
FIG. 11 is a schematic diagram of executing a conflict resolution policy based on indication information of a sensing sub-window according to an embodiment of this disclosure.
Figure 12:
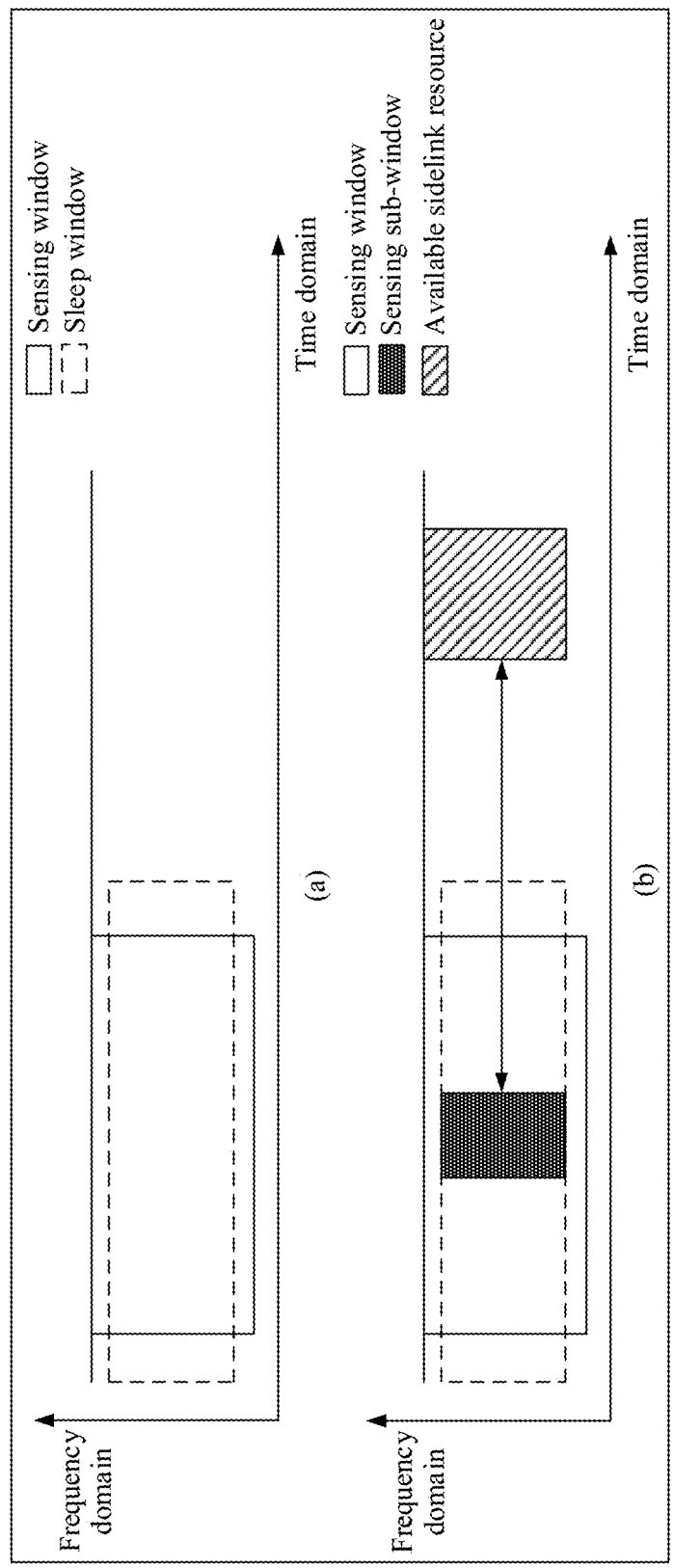
FIG. 12 is another schematic diagram of executing a conflict resolution policy based on indication information of a sensing sub-window according to an embodiment of this disclosure.
Figure 13:
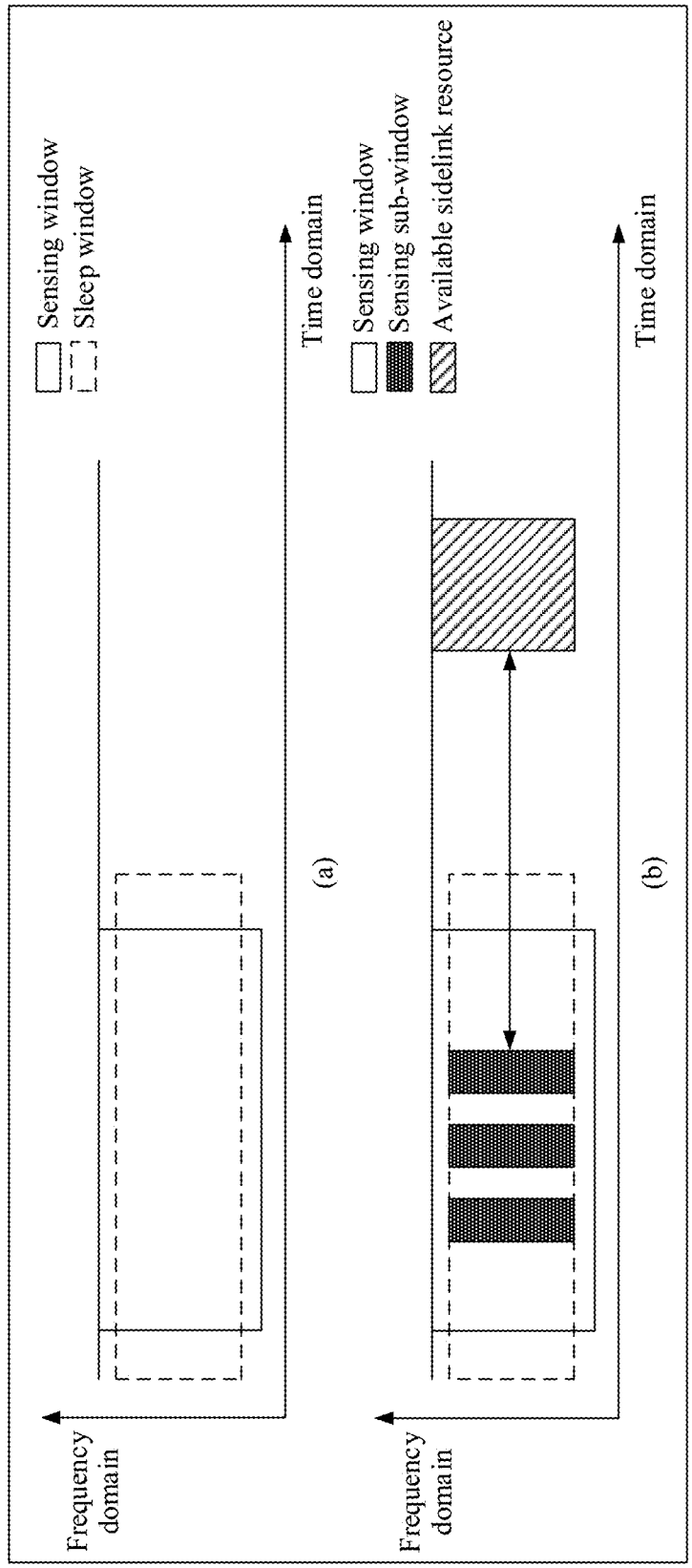
FIG. 13 is still another schematic diagram of executing a conflict resolution policy based on indication information of a sensing sub-window according to an embodiment of this disclosure.
Figure 14:
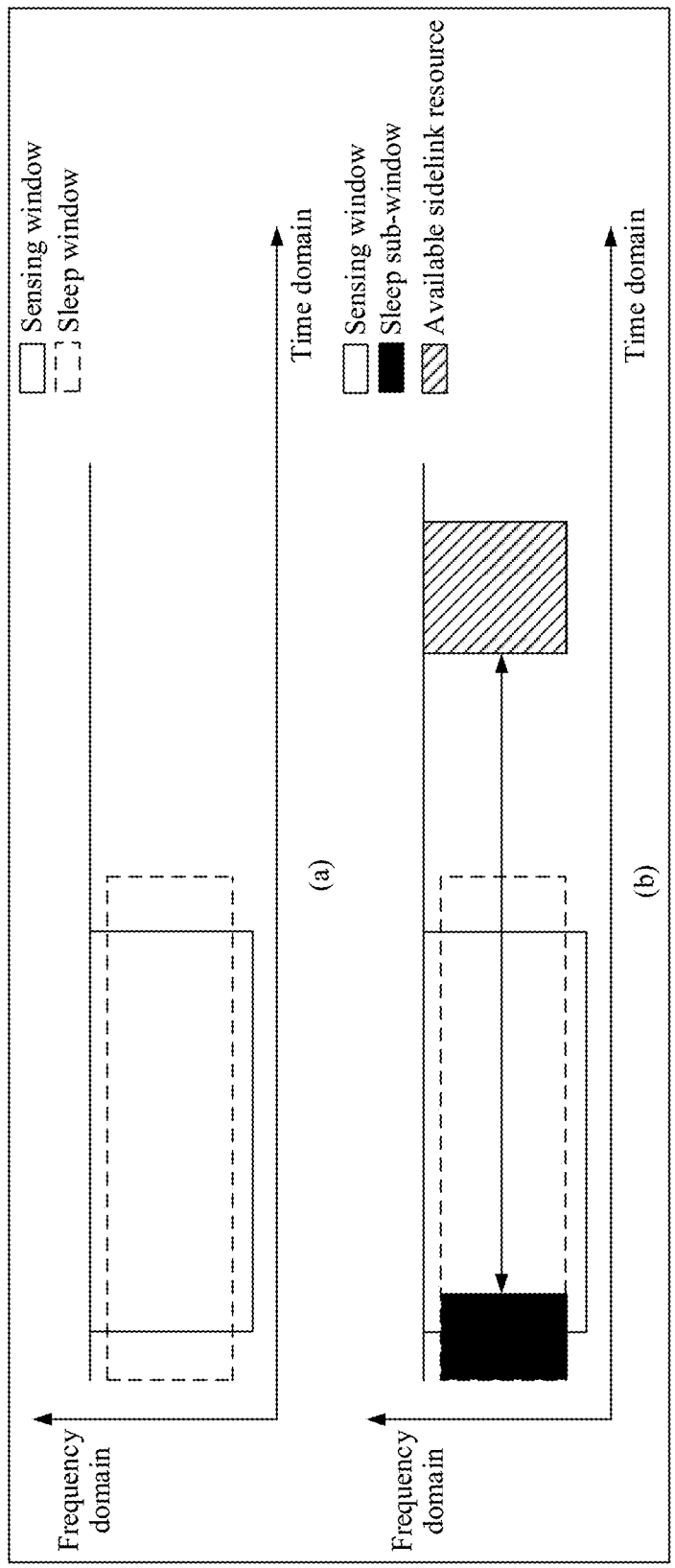
FIG. 14 is a schematic diagram of executing a conflict resolution policy based on indication information of a sleep sub-window according to an embodiment of this disclosure.

In the first implementation, the sub-window is a part of the target sleep window at the front or a part of the target sleep window at the rear. FIG. 11 to FIG. 16 each are a schematic diagram of executing a conflict resolution policy based on indication information of a sub-window according to an embodiment of this disclosure. As shown in FIG. 11, a sub-window in FIG. 11 is a part of the target sleep window at the rear. As shown in FIG. 14, a sub-window in FIG. 14 is a part of the target sleep window at the front.

In a second implementation, if the indication information of the sub-window includes the start location information and the end location information, the sub-window is determined from the target sleep window based on the start location information and the end location information.

Figure 15:
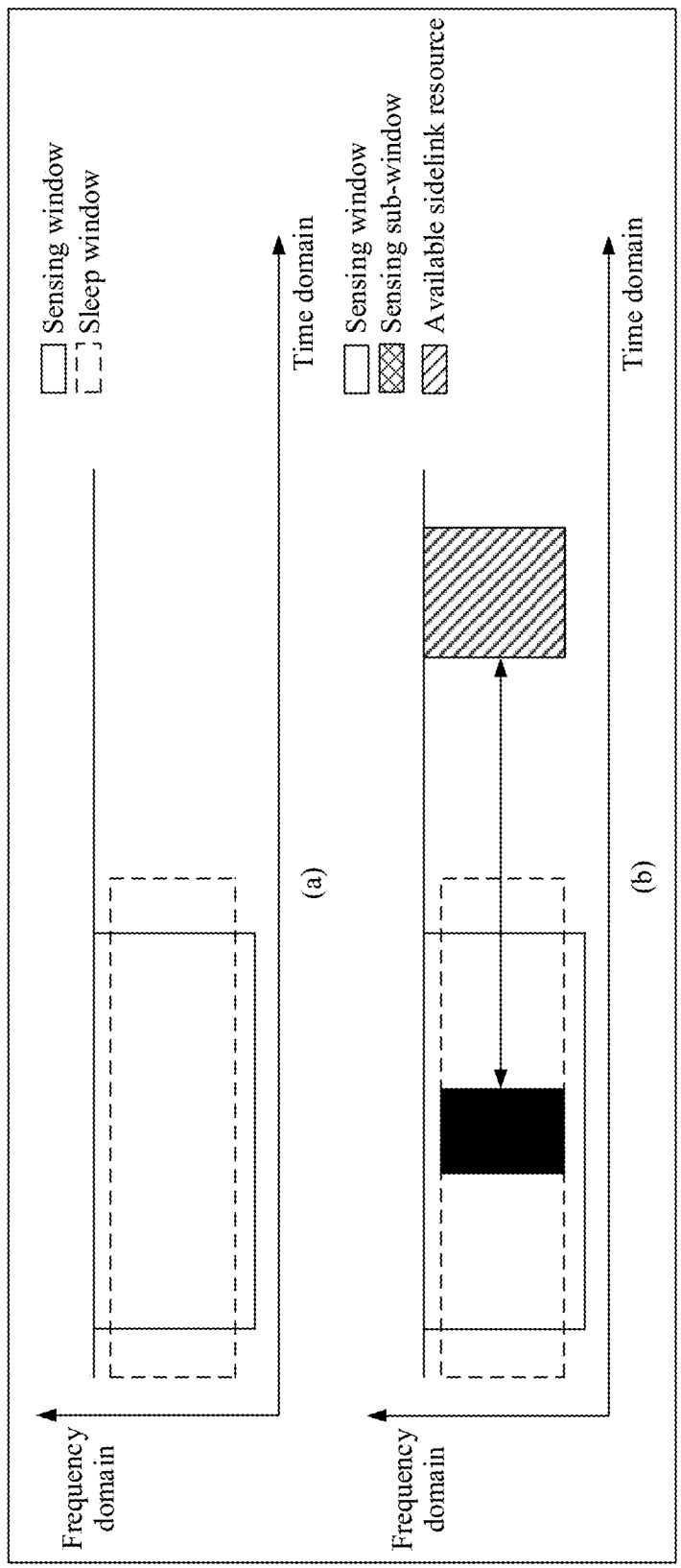
FIG. 15 is another schematic diagram of executing a conflict resolution policy based on indication information of a sensing sub-window according to an embodiment of this disclosure.

In the second implementation, the sub-window may be a part of the target sleep window at the front or a part of the target sleep window at the rear, or may be a part of the target sleep window in the middle. Refer to FIG. 12 and FIG. 15. Sub-windows in FIG. 12 and FIG. 15 each are a part of the target sleep window in the middle.

In a third implementation, if the indication information of the sub-window includes the start location information of the first window and the end location information of the last window in the plurality of windows that are spaced from each other, and the spacing rule for the plurality of windows, the plurality of windows are determined from the target sleep window based on the start location information of the first window, the end location information of the last window, and the spacing rule for the plurality of windows, and are used as the sub-window.

In an example, if the spacing rule for the plurality of windows is the window indication information of each resource unit in the plurality of resource units included in the target window, where the target window is the window from the start location of the first window to the end location of the last window, and the window indication information of each resource unit is used to indicate whether the resource unit belongs to a sub-window, the plurality of windows may be determined from the target window based on the window indication information of each resource unit in the plurality of resource units included in the target window. The target window may be determined based on the start location information of the first window and the end location information of the last window.

Figure 16:
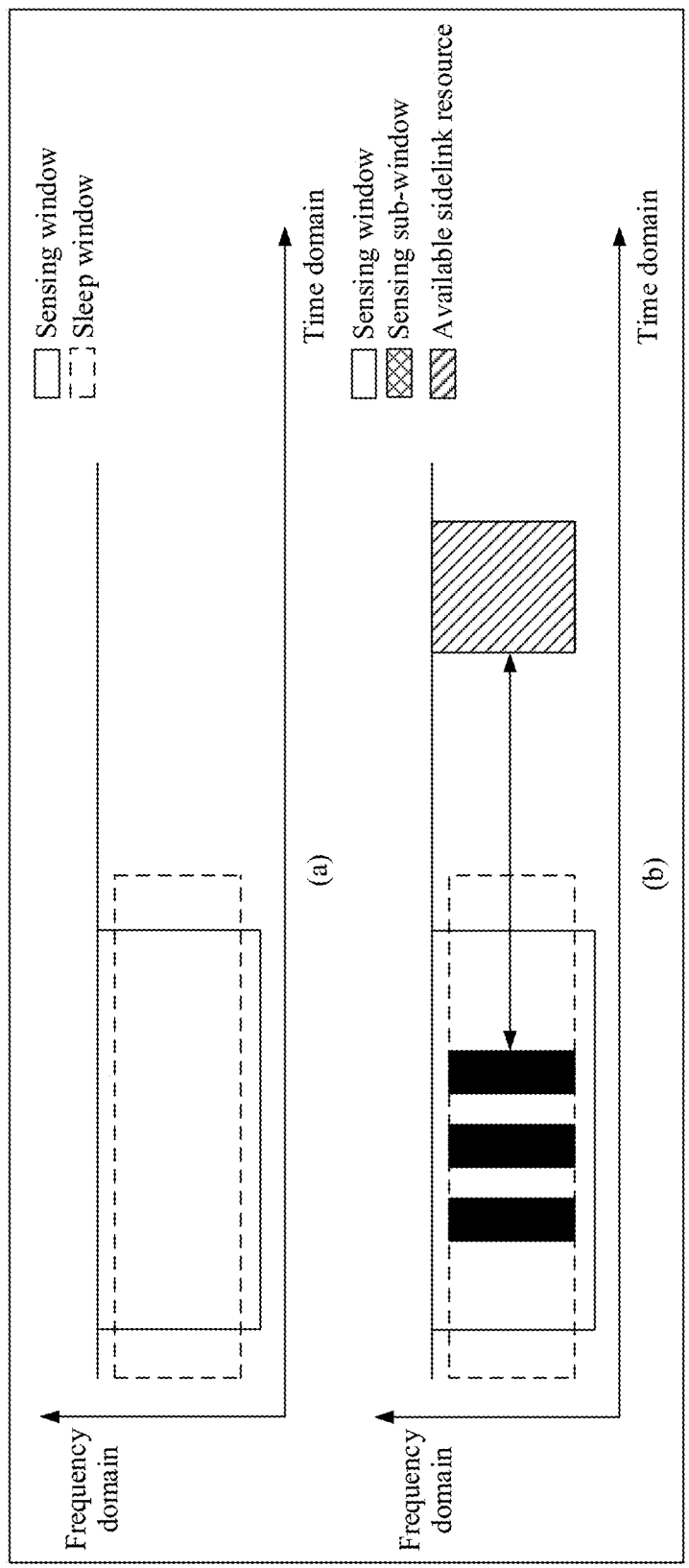
FIG. 16 is still another schematic diagram of executing a conflict resolution policy based on indication information of a sensing sub-window according to an embodiment of this disclosure.

In the third implementation, the sub-window includes a plurality of windows that are spaced from each other. Refer to FIG. 13 and FIG. 16. Sub-windows in FIG. 13 and FIG. 16 each are a plurality of windows that are spaced from each other in target sleep windows.

Step 1005: The terminal performs the sensing operation in the sub-window of the target sleep window, and is in the sleep state in a window other than the sub-window of the target sleep window, or is in the sleep state in the sub-window of the target sleep window, and performs the sensing operation in a window other than the sub-window of the target sleep window.

It should be noted that, the terminal may determine, based on a standard specification, a rule negotiated with the communication device in advance, or related information carried in the first configuration information, whether the sub-window is a sensing sub-window or a sleep sub-window, and determine whether to perform the sensing operation in the sub-window of the target sleep window and enter the sleep state in the window other than the sub-window, or enter the sleep state in the sub-window of the target sleep window and perform the sensing operation in the window other than the sub-window.

For example, if the first configuration information further includes the first window indication information, the terminal may perform, based on the indication information of the sub-window, the sensing operation in the sub-window determined from the target sleep window, and enter the sleep state in the window other than the sub-window in the target sleep window. If the first configuration information further includes the second window indication information, the terminal may enter the sleep state in the sub-window determined from the target sleep window based on the indication information of the sub-window, and perform the sensing operation in the window other than the sub-window in the target sleep window.

FIG. 11 to FIG. 13 are three schematic diagrams of executing a conflict resolution policy based on indication information of a sensing sub-window according to an embodiment of this disclosure. In FIG. 11 to FIG. 13, a solid-line box is a sensing window, a dashed-line box is a sleep window, a black dot box is a sensing sub-window used to perform a sensing operation, and a slashed box is an available sidelink resource. As shown in (a) in FIG. 11, (a) in FIG. 12, and (a) in FIG. 13, in the conventional technology, when the sleep window conflicts with the sensing window, in some windows that conflict with each other, the terminal does not know whether to perform the sensing operation or switch to an idle mode. Consequently, the terminal cannot properly perform the sensing operation, and further cannot sense an available sidelink resource required for subsequent data transmission or smoothly implement a data service. In this embodiment of this disclosure, as shown in (b) in FIG. 11, (b) in FIG. 12, and (b) in FIG. 13, after the terminal receives the first configuration information including the indication information of the sub-window, when the sleep window conflicts with the sensing window, the terminal may perform the sensing operation in the sensing sub-window in the target sleep window, and enter the sleep state in a window other than the sensing sub-window in the target sleep window. The target sleep window is a sleep window that conflicts with the sensing window.

FIG. 14 to FIG. 16 are three schematic diagrams of executing a conflict resolution policy based on indication information of a sleep sub-window according to an embodiment of this disclosure. In FIG. 14 to FIG. 16, a solid-line box is a sensing window, a dashed-line box is a sleep window, a black box is a sleep sub-window in which a sleep state is entered, and a slashed box is an available sidelink resource. As shown in (a) in FIG. 14, (a) in FIG. 15, and (a) in FIG. 16, in the conventional technology, when the sleep window conflicts with the sensing window, in some windows that conflict with each other, the terminal does not know whether to perform the sensing operation or switch to an idle mode. Consequently, the terminal cannot properly perform the sensing operation, and further cannot sense an available sidelink resource required for subsequent data transmission or smoothly implement a data service. In this embodiment of this disclosure, as shown in (b) in FIG. 14, (b) in FIG. 15, and (b) in FIG. 16, after the terminal receives the first configuration information including the indication information of the sub-window, when the sleep window conflicts with the sensing window, the terminal may enter the sleep state in the sleep sub-window in the target sleep window, and perform the sensing operation in a window other than the sleep sub-window in the target sleep window. The target sleep window is a sleep window that conflicts with the sensing window.

It should be noted that FIG. 11 to FIG. 16 are merely described by using an example in which the target sleep window is the sleep window that conflicts with the sensing window. In another case, the target sleep window may be a part of the sleep window that conflicts with the sensing window.

In this embodiment of this disclosure, the indication information of the sub-window may be transmitted to indicate the terminal to perform, when the sleep window conflicts with the sensing window, the sensing operation in a part of the target sleep window that conflicts with the sensing window, and enter the sleep state in another part of the target sleep window. This avoids a problem of a conflict between a sensing operation and a sleep state in a target sleep window, and ensures smooth implementation of a data service while reducing power consumption overheads of a device.

In embodiments, the communication device and the terminal may be divided into functional modules based on the foregoing method examples, for example, each functional module may be obtained through division based on each corresponding function, or two or more functions may be integrated into one processing module. The integrated module may be implemented in a form of hardware. It should be noted that, in embodiments, division into modules is an example and is merely logical function division. During actual implementation, there may be another division manner.

Figure 17:
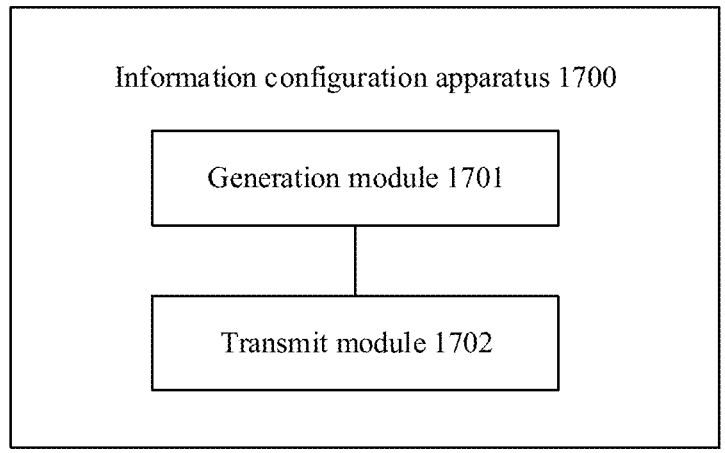
FIG. 17 is a schematic diagram of a structure of an information configuration apparatus according to an embodiment of this disclosure.

FIG. 17 is a schematic diagram of a structure of an information configuration apparatus 1700 according to an embodiment of this disclosure. The information configuration apparatus 1700 may be implemented as a part or all of a communication device by software, hardware, or a combination thereof. The communication device may be the communication device 101 shown in FIG. 1. As shown in FIG. 17, the information configuration apparatus 1700 may include a generation module 1701 and a transmit module 1702.

The generation module 1701 is configured to perform step 701 in the embodiment in FIG. 7.

The transmit module 1702 is configured to perform step 702 in the embodiment in FIG. 7.

Optionally, first configuration information includes one or more of the following information: sensing operation indication information, where the sensing operation indication information is used to indicate to perform a sensing operation in a target sleep window, and the target sleep window is all or a part of a sleep window that conflicts with a sensing window, indication information of a sub-window, where the sub-window is a window associated with the target sleep window, and the sensing operation needs to be performed in the sub-window associated with the target sleep window, and a sleep state needs to be entered in a window other than the sub-window in the target sleep window, or a sleep state needs to be entered in the sub-window associated with the target sleep window, and the sensing operation needs to be performed in a window other than the sub-window in the target sleep window, and indication information of an available sidelink resource, where the available sidelink resource is a sidelink resource that is required for data transmission and that is configured when the sleep state is entered in the target sleep window.

Optionally, the first configuration information includes the indication information of the sub-window, and the first configuration information further includes first window indication information or second window indication information.

The sensing operation needs to be performed in a sensing sub-window associated with the target sleep window, and the sleep state needs to be entered in a window other than the sensing sub-window in the target sleep window.

The second window indication information is used to indicate that the sub-window is a sleep sub-window, the sleep state needs to be entered in the sleep sub-window associated with the target sleep window, and the sensing operation needs to be performed in a window other than the sleep sub-window in the target sleep window.

Optionally, the indication information of the sub-window includes one or more of the following information: window size information of the sub-window, where a start location of the sub-window is a start location of the target sleep window, or an end location of the sub-window is an end location of the target sleep window, start location information and end location information of the sub-window, and start location information of the first window in a plurality of windows that are spaced from each other and included in the sub-window, end location information of the last window in the plurality of windows, and a spacing rule for the plurality of windows.

Optionally, the spacing rule for the plurality of windows is window indication information of each resource unit in a plurality of resource units included in a target window.

The target window is a window from a start location of the first window to an end location of the last window, the window indication information of each resource unit is used to indicate whether each resource unit belongs to the sub-window, and the resource unit includes a time domain unit and/or a frequency domain unit.

Optionally, the apparatus further includes an operation module configured to perform an auxiliary sensing operation, to obtain indication information of the available sidelink resource.

Optionally, the transmit module 1702 is configured to, before transmitting DRX configuration information or sensing window configuration information, transmit the first configuration information, where the DRX configuration information is used to indicate the sleep window, and the sensing window configuration information is used to indicate the sensing window, or transmit second configuration information, where the second configuration information includes the first configuration information and one or more of the following information: DRX configuration information or sensing window configuration information, or before transmitting DRX configuration information or sensing window configuration information, transmit first sub-information, and transmit third configuration information, where the third configuration information includes second sub-information and one or more of the following information: DRX configuration information or sensing window configuration information, the first sub-information is a part of the first configuration information, and the second sub-information is another part of the first configuration information.

In this embodiment of this disclosure, a conflict resolution policy used when the sleep window conflicts with the sensing window may be configured for a terminal by transmitting the first configuration information, so that the terminal executes the corresponding conflict resolution policy used when the sleep window conflicts with the sensing window. This resolves a problem that the terminal does not know whether to perform the sensing operation or enter the sleep state when the sleep window conflicts with the sensing window, and ensures smooth implementation of a data service while reducing power consumption overheads of a device.

Figure 18:
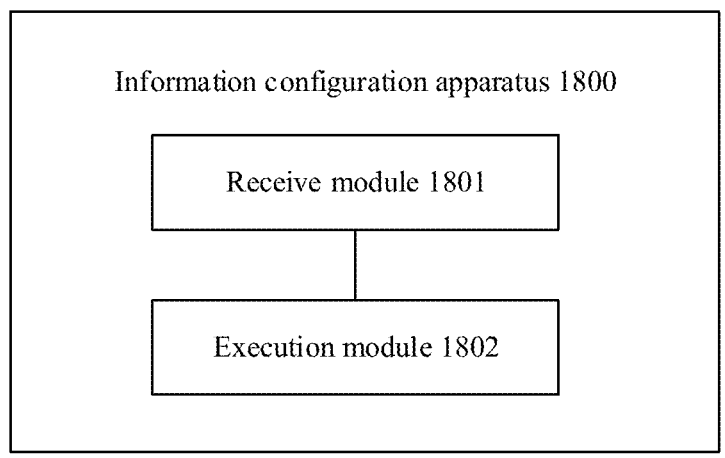
FIG. 18 is a schematic diagram of a structure of another information configuration apparatus according to an embodiment of this disclosure.

FIG. 18 is a schematic diagram of a structure of another information configuration apparatus 1800 according to an embodiment of this disclosure. The information configuration apparatus 1800 may be implemented as a part or all of a terminal by software, hardware, or a combination thereof. The terminal may be the terminal 102 shown in FIG. 1. As shown in FIG. 18, the information configuration apparatus 1800 may include a receive module 1801 and an execution module 1802.

The receive module 1801 is configured to perform step 703 in the embodiment in FIG. 7.

The execution module 1802 is configured to perform step 704 in the embodiment in FIG. 7.

Optionally, the execution module 1802 is configured to perform one or more of the following manners: if first configuration information includes sensing operation indication information, performing a sensing operation in a target sleep window, if the first configuration information includes indication information of a sub-window, performing the sensing operation in the sub-window determined from the target sleep window based on the indication information of the sub-window, and entering a sleep state in a window other than the sub-window in the target sleep window, or entering a sleep state in the sub-window determined from the target sleep window based on the indication information of the sub-window, and performing the sensing operation in a window other than the sub-window in the target sleep window, and if the first configuration information includes indication information of an available sidelink resource, entering the sleep state in the target sleep window, and transmitting data based on the available sidelink resource.

Optionally, the execution module 1802 is configured to, if the first configuration information includes the indication information of the sub-window and first window indication information, perform the sensing operation in the sub-window determined from the target sleep window based on the indication information of the sub-window, and enter the sleep state in the window other than the sub-window in the target sleep window, where the first window indication information is used to indicate that the sub-window is a sensing sub-window, and if the first configuration information includes the indication information of the sub-window and second window indication information, enter the sleep state in the sub-window determined from the target sleep window based on the indication information of the sub-window, and perform the sensing operation in the window other than the sub-window in the target sleep window, where the second window indication information is used to indicate that the sub-window is a sleep sub-window.

Optionally, the apparatus further includes a determining module configured to determine the sub-window from the target sleep window based on the indication information of the sub-window.

Optionally, the determining module is configured to, if the indication information of the sub-window includes window size information, determine the sub-window from the target sleep window based on the window size information by using a start location of the target sleep window as a start location or by using an end location of the target sleep window as an end location, if the indication information of the sub-window includes start location information and end location information, determine the sub-window from the target sleep window based on the start location information and the end location information, and if the indication information of the sub-window includes start location information of the first window and end location information of the last window in a plurality of windows that are spaced from each other, and a spacing rule for the plurality of windows, determine the plurality of windows from the target sleep window based on the start location information of the first window, the end location information of the last window, and the spacing rule for the plurality of windows, and use the plurality of windows as the sub-window.

Optionally, the spacing rule for the plurality of windows is window indication information of each resource unit in a plurality of resource units included in a target window, the target window is a window from a start location of the first window to an end location of the last window, and the window indication information of each resource unit is used to indicate whether each resource unit belongs to the sub-window.

The determining module is configured to determine the target window based on the start location information of the first window and the end location information of the last window, and determine the plurality of windows from the target window based on the window indication information of each resource unit in the plurality of resource units included in the target window.

Optionally, the receive module 1801 is configured to, before receiving DRX configuration information or sensing window configuration information, receive the first configuration information, where the DRX configuration information is used to indicate a sleep window, and the sensing window configuration information is used to indicate a sensing window, or receive second configuration information, where the second configuration information includes the first configuration information and one or more of the following information: DRX configuration information or sensing window configuration information, or before receiving DRX configuration information or sensing window configuration information, receive first sub-information, and receive third configuration information, where the third configuration information includes second sub-information and one or more of the following information: DRX configuration information or sensing window configuration information, the first sub-information is a part of the first configuration information, and the second sub-information is another part of the first configuration information.

In this embodiment of this disclosure, the first configuration information is received, and a corresponding conflict resolution policy is executed based on the first configuration information when the sleep window conflicts with the sensing window. This resolves a problem that the terminal does not know whether to perform the sensing operation or enter the sleep state when the sleep window conflicts with the sensing window, and ensures smooth implementation of a data service while reducing power consumption overheads of a device.

It should be noted that, during information configuration performed by the information configuration apparatus provided in embodiments, division of the functional modules is only used as an example for description. In actual application, the functions may be allocated to different functional modules for implementation, depending on a requirement, in other words, an internal structure of an apparatus is divided into different functional modules to implement all or some of the functions described above. In addition, the information configuration apparatus provided in embodiments and embodiments of the information configuration method pertain to a same concept. For a specific implementation process of the information configuration apparatus, refer to the method embodiments. Details are not described herein again.

All or some of the foregoing embodiments may be implemented by using software, hardware, firmware, or any combination thereof. When software is used to implement embodiments, all or some of embodiments may be implemented in a form of a computer program product. The computer program product includes one or more computer instructions. When the computer instructions are loaded and executed on a computer, the procedure or functions according to embodiments of this disclosure are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (SSD)), or the like.

The foregoing descriptions are merely embodiments of this disclosure, but are not intended to limit this disclosure. Any modification, equivalent replacement, or improvement made without departing from the spirit and principle of this disclosure should fall within the protection scope of this disclosure.

What is claimed is:

1. A method implemented by a communication device, wherein the method comprises:
generating first configuration information comprising:
a conflict resolution policy to be used when a sleep window conflicts with a sensing window, wherein the sleep window is a first time resource in which a sleep state is to be entered, and wherein the sensing window is a second time resource in which a sensing operation is to be performed; and either:
first window indication information indicating a sensing sub-window, wherein a sensing operation is to be performed in the sensing sub-window, and wherein the sleep state is to be entered in a window other than the sensing sub-window in a target sleep window; or
second window indication information indicating a sleep sub-window, wherein the sleep state is to be entered in the sleep sub-window, and wherein the sensing operation is to be performed in a window other than the sleep sub-window in the target sleep window; and
transmitting the first configuration information.

2. The method of claim 1, wherein the first configuration information further comprises:
sensing operation indication information instructing to perform the sensing operation in a target sleep window, wherein the target sleep window is all or a part of the sleep window; and/or
first indication information of a sub-window that is associated with the target sleep window, wherein the sensing operation is to be performed in the sub-window and the sleep state is to be entered in a window other than the sub-window in the target sleep window, or wherein the sleep state is to be entered in the sub-window and the sensing operation is to be performed in the window other than the sub-window in the target sleep window; and/or
second indication information of an available sidelink resource that is configured when the sleep state is entered in the target sleep window.

3. The method of claim 2, wherein the second indication information comprises:
window size information of the sub-window, wherein a first start location of the sub-window is a second start location of the target sleep window, or wherein a first end location of the sub-window is a second end location of the target sleep window; and/or
first start location information of the sub-window and first end location information of the sub-window; and/or
second start location information of a first window in a plurality of windows that are spaced from each other and comprised in the sub-window, second end location information of a last window in the windows, and a spacing rule for the windows.

4. The method of claim 3, wherein the spacing rule comprises window indication information of each resource unit in a plurality of resource units comprised in a target window, wherein the target window is from a third start location of the first window to a third end location of the last window, wherein the window indication information indicates whether each of the resource units belongs to the sub-window, and wherein each of the resource units comprises a time domain unit or a frequency domain unit.

5. The method of claim 2, wherein the first configuration information comprises the second indication information, and wherein before transmitting the first configuration information, the method further comprises performing an auxiliary sensing operation to obtain the second indication information.

6. The method of claim 1, further comprising:
transmitting the first configuration information before transmitting discontinuous reception (DRX) configuration information or sensing window configuration information, wherein the DRX configuration information indicates the sleep window, and wherein the sensing window configuration information indicates the sensing window;
transmitting second configuration information comprising the first configuration information and one or more of the DRX configuration information or the sensing window configuration information; or
transmitting first sub-information and third configuration information before transmitting the DRX configuration information or the sensing window configuration information, wherein the third configuration information comprises second sub-information and one or more of the DRX configuration information or the sensing window configuration information, wherein the first sub-information is a first part of the first configuration information, and wherein the second sub-information is a second part of the first configuration information.

7. The method of claim 1, further comprising determining the sub-window from the target sleep window based on the first indication information.

8. A method implemented by a terminal, wherein the method comprises:
receiving first configuration information indicating a conflict resolution policy to be used when a sleep window of the terminal conflicts with a sensing window of the terminal, wherein the sleep window is a first time resource in which a sleep state is to be entered, and wherein the sensing window is a second time resource in which a sensing operation is to be performed;
further receiving the first configuration information before receiving discontinuous reception (DRX) configuration information or sensing window configuration information, wherein the DRX configuration information indicates the sleep window, and wherein the sensing window configuration information indicates the sensing window; and either:
receiving second configuration information, wherein the second configuration information comprises the first configuration information and one or more of the DRX configuration information or the sensing window configuration information; or
receiving first sub-information and third configuration information before receiving the DRX configuration information or the sensing window configuration information, wherein the third configuration information comprises second sub-information and one or more of the DRX configuration information or the sensing window configuration information, wherein the first sub-information is a first part of the first configuration information, and wherein the second sub-information is a second part of the first configuration information; and
executing the conflict resolution policy in a target sleep window based on the first configuration information, wherein the target sleep window is all or a part of the sleep window.

9. The method of claim 8, further comprising:
when the first configuration information comprises second indication information of an available sidelink resource:
entering the sleep state in the target sleep window; and
performing data transmission based on the available sidelink resource;
performing the sensing operation in the target sleep window when the first configuration information comprises sensing operation indication information;
when the first configuration information comprises first indication information of a sub-window:
performing the sensing operation in the sub-window of the target sleep window based on the first indication information and entering the sleep state in a window other than the sub-window in the target sleep window; or
entering the sleep state in the sub-window and performing the sensing operation in the window other than the sub-window in the target sleep window.

10. The method of claim 9, further comprising:
when the first configuration information comprises the first indication information and first window indication information indicating that the sub-window is a sensing sub-window:
performing the sensing operation in the sensing sub-window; and
entering the sleep state in a window other than the sensing sub-window in the target sleep window; and
when the first configuration information comprises the first indication information and second window indication information indicating that the sub-window is a sleep sub-window:
entering the sleep state in the sleep sub-window; and
performing the sensing operation in a window other than the sleep sub-window.

11. The method of claim 9, further comprising determining the sub-window from the target sleep window based on the first indication information.

12. The method of claim 11, further comprising:
determining, based on window size information, the sub-window from the target sleep window using a first start location of the target sleep window as a second start location of the sub-window or using a first end location of the target sleep window as a second end location of the sub-window when the first indication information comprises the window size information;
determining the sub-window from the target sleep window based on first start location information of the sub-window and first end location information of the sub-window when the first indication information comprises the first start location information and the first end location information; and
determining a plurality of windows from the target sleep window based on second start location information of a first window in the windows, second end location information of a last window in the windows, and a spacing rule for the windows and using the windows as the sub-window when the first indication information comprises the second start location information, the second end location information, and the spacing rule.

13. The method of claim 12, wherein the spacing rule comprises window indication information of each resource unit in a plurality of resource units comprised in a target window, wherein the target window is from a third start location of the first window to a third end location of the last window, wherein the window indication information of each of the resource units indicates whether each of the resource units belongs to the sub-window, and wherein the method further comprises:
    determining the target window based on the second start location information and the second end location information; and
    further determining the windows from the target window based on the window indication information.

14. A terminal comprising:
    a memory configured to store instructions; and
    a processor coupled to the memory and configured to execute the instructions to cause the terminal to:
        receive first configuration information indicating a conflict resolution policy to be used when a sleep window of the terminal conflicts with a sensing window of the terminal, wherein the sleep window is a first time resource in which a sleep state is to be entered, and wherein the sensing window is a second time resource in which a sensing operation is to be performed;
        execute the conflict resolution policy in a target sleep window based on the first configuration information, wherein the target sleep window is all or a part of the sleep window;
        when the first configuration information comprises second indication information of an available sidelink resource:
            enter the sleep state in the target sleep window; and
            perform data transmission based on the available sidelink resource;
        when the first configuration information comprises sensing operation indication information, perform the sensing operation in the target sleep window;
        when the first configuration information comprises first indication information of a sub-window:
            perform the sensing operation in the sub-window of the target sleep window based on the first indication information and enter the sleep state in a window other than the sub-window in the target sleep window; or
            enter the sleep state in the sub-window and perform the sensing operation in the window other than the sub-window in the target sleep window.

15. The terminal of claim 14, wherein the processor is further configured to execute the instructions to cause the terminal to:
    when the first configuration information comprises the first indication information and first window indication information indicating that the sub-window is a sensing sub-window:
        perform the sensing operation in the sensing sub-window; and
        enter the sleep state in a window other than the sensing sub-window in the target sleep window; and
    when the first configuration information comprises the first indication information and second window indication information indicating that the sub-window is a sleep sub-window:
        enter the sleep state in the sleep sub-window; and
        perform the sensing operation in a window other than the sleep sub-window.

16. The terminal of claim 14, wherein the processor is further configured to execute the instructions to cause the terminal to determine the sub-window from the target sleep window based on the first indication information.

17. The terminal of claim 16, wherein the first configuration information comprises the first indication information, and wherein the first configuration information further comprises:
    first window indication information indicating that the sub-window is a sensing sub-window, wherein the sensing operation is to be performed in the sensing sub-window, and wherein the sleep state is to be entered in a window other than the sensing sub-window in the target sleep window; or
    second window indication information indicating that the sub-window is a sleep sub-window, wherein the sleep state is to be entered in the sleep sub-window, and wherein the sensing operation is to be performed in a window other than the sleep sub-window in the target sleep window.

18. The terminal of claim 14, wherein the first configuration information comprises one or more of:
    sensing operation indication information instructing to perform the sensing operation in a target sleep window, wherein the target sleep window is all or a part of the sleep window;
    first indication information of a sub-window that is associated with the target sleep window, wherein the sensing operation is to be performed in the sub-window and the sleep state is to be entered in a window other than the sub-window in the target sleep window, or wherein the sleep state is to be entered in the sub-window and the sensing operation is to be performed in the window other than the sub-window in the target sleep window; or
    second indication information of an available sidelink resource that is configured when the sleep state is entered in the target sleep window.

19. The terminal of claim 14, wherein the processor is further configured to execute the instructions to cause the terminal to:
    further receive the first configuration information before receiving discontinuous reception (DRX) configuration information or sensing window configuration information, wherein the DRX configuration information indicates the sleep window, and wherein the sensing window configuration information indicates the sensing window;
    receive second configuration information, wherein the second configuration information comprises the first configuration information and one or more of the DRX configuration information or the sensing window configuration information; or
    receive first sub-information and third configuration information before receiving the DRX configuration information or the sensing window configuration information, wherein the third configuration information comprises second sub-information and one or more of the DRX configuration information or the sensing window configuration information, wherein the first sub-information is a first part of the first configuration information, and wherein the second sub-information is a second part of the first configuration information.

20. The terminal of claim 14, wherein the processor is further configured to execute the instructions to cause the terminal to:
    determine, based on window size information, the sub-window from the target sleep window using a first start location of the target sleep window as a second start location of the sub-window or using a first end location of the target sleep window as a second end location of the sub-window when the first indication information comprises the window size information;

determine the sub-window from the target sleep window based on first start location information of the sub-window and first end location information of the sub-window when the first indication information comprises the first start location information and the first end location information; and determine a plurality of windows from the target sleep window based on second start location information of a first window in the windows, second end location information of a last window in the windows, and a spacing rule for the windows and using the windows as the sub-window when the first indication information comprises the second start location information, the second end location information, and the spacing rule.

* * * * *